United States Patent [19]
Volftsun et al.

[11] Patent Number: 6,111,893
[45] Date of Patent: Aug. 29, 2000

[54] UNIVERSAL PROTOCOL CONVERSION

[75] Inventors: Lev Volftsun, Herndon; Clay H. Neighbors, Reston; David S. Turvene; Fred R. Rednor, both of Arlington; Anatoly V. Boshkin; Mikhail Rabinovitch, both of Herndon, all of Va.

[73] Assignee: Cisco Technology, Inc., San Jose, Calif.

[21] Appl. No.: 08/904,295

[22] Filed: Jul. 31, 1997

[51] Int. Cl.[7] .................................................. H04J 3/16
[52] U.S. Cl. ............................................. 370/466; 370/467
[58] Field of Search .................................. 370/401, 402, 370/465, 466, 467, 524; 379/242

[56] References Cited

U.S. PATENT DOCUMENTS

| | | |
|---|---|---|
| Re. 34,536 | 2/1994 | Frimmel, Jr. . |
| 4,979,207 | 12/1990 | Baum et al. . |
| 5,027,388 | 6/1991 | Bradshaw et al. . |
| 5,182,748 | 1/1993 | Shigekazu et al. . |
| 5,239,542 | 8/1993 | Breidenstein et al. ............. 370/79 |
| 5,414,762 | 5/1995 | Flisik et al. . |
| 5,420,916 | 5/1995 | Sekiguchi . |
| 5,426,694 | 6/1995 | Hebert . |
| 5,428,771 | 6/1995 | Daniels et al. . |
| 5,517,563 | 5/1996 | Norell . |
| 5,530,434 | 6/1996 | Kanada . |
| 5,535,336 | 7/1996 | Smith et al. . |
| 5,535,373 | 7/1996 | Olnowich . |
| 5,537,679 | 7/1996 | Crosbie et al. . |
| 5,539,787 | 7/1996 | Nakano et al. . |
| 5,543,785 | 8/1996 | Vatt et al. . |
| 5,546,450 | 8/1996 | Suthard et al. . |
| 5,546,453 | 8/1996 | Hebert ................................... 379/242 |
| 5,550,820 | 8/1996 | Baran . |
| 5,581,558 | 12/1996 | Horney, II et al. . |
| 5,703,876 | 12/1997 | Christie ................................. 370/395 |
| 5,793,771 | 8/1998 | Darland et al. ...................... 370/467 |
| 5,815,501 | 9/1998 | Gaddis et al. ........................ 370/402 |

FOREIGN PATENT DOCUMENTS

| | | | |
|---|---|---|---|
| WO95/31057 | 11/1995 | WIPO ........................... H04L 12/24 |
| WO97/09807 | 3/1997 | WIPO ........................... H04L 12/64 |
| WO97/09808 | 3/1997 | WIPO ........................... H04L 12/66 |

*Primary Examiner*—Huy D. Vu
*Assistant Examiner*—Alexander Boakye
*Attorney, Agent, or Firm*—Hickman Palermo Truong & Becker LLP; Christopher J. Palermo

[57] ABSTRACT

A scalable, programmable software based application run on a programmed general purpose digital computer is used for interconnecting a plurality of heterogeneous network nodes. The application has the ability to convert between any two signaling protocols used, such as those used over a telecommunications network, by converting an originating protocol to a universal non-protocol specific representation, and then converting the universal non-protocol specific representation to a receiving protocol. A call context is used to store information elements created from the originating protocol so that a universal call model applies inter-working rules. The universal call model is also in communication with state machines associated with both the originating and the terminating sides in order to supply the appropriate response signals anticipated by the originating and terminating sides received when each is in communication with its own protocol. As such, the universal call model allows both the originating and terminating sides of a call to operate independently of each other by virtue of the fact that each side deal through the universal call model and not directly with the side for which the protocol message is being converted. Therefore, any protocol is easily converted to any other protocol by first translating the protocol message to the universal protocol non-specific format.

18 Claims, 26 Drawing Sheets

Fig. 9A

- 900 TERMINATING BEARER CHANNEL SERVICE STATE
- 902 TERMINATING BEARER CHANNEL IDENTIFIER
- 904 ORIGINATING USER/NETWORK FLAG
- 906 TERMINATING USER/NETWORK FLAG
- 908 ORIGINATING CALL REFERENCE
- 910 TERMINATING CALL IDENTIFIER
- 912 ORIGINATING SIGNALING CHANNEL IDENTIFIER
- 914 TERMINATING SIGNALING CHANNEL IDENTIFIER
- 916 ORIGINATING OVERLAP/ENBLOCK FLAG
- 918 TERMINATING OVERLAP/ENBLOCK FLAG
- 920 ORIGINATING MIN MESSAGE LENGTH
- 922 ORIGINATING MAX MESSAGE LENGTH
- 924 ACTUAL ORIGINATING PARTY ID
- 926 CALLING LINE I/F VALIDATION FEATURE FLAG
- 928 NUMBER TRANSLATION FEATURE FLAG
- 930 TONE DETECTION FEATURE FLAG
- 932 ORIGINATING SIGNAL SET
- 934 TERMINATING SIGNAL SET
- 936 ORIGINATING PROTOCOL TYPE
- 938 ORIGINATING PROTOCOL GROUP
- 940 TERMINATING PROTOCOL TYPE
- 942 TERMINATING PROTOCOL GROUP
- 944 LOCAL MODE
- 946 BUFFER MODE
- 948 CALLING LINE IDENTIFICATION
- 950 BUFFER
- 952 SENDING COMPLETE FLAG
- 954 DIALED DESTINATION NUMBER
- 956 TRANSLATED DESTINATION NUMBER
- 958 BEARER CAPABILITIES

| 990a | CALL CONTEXT BEFORE APPLICATION OF RULE 970 | 954 904 567 1234 | 956 | 958 FAX | 960 407 567 1234 | 962 407 567 1234 |
|---|---|---|---|---|---|---|
| 990b | CALL CONTEXT AFTER APPLICATION OF RULE 970 | 954 904 567 1234 | 956 67 1234 | 958 FAX | 960 407 567 1234 | 962 407 567 1234 |

*Fig. 9C*

| 992a | CALL CONTEXT BEFORE APPLICATION OF RULE 970 | 954 904 567 1234 | 956 | 958 FAX | 960 415 234 1234 | 962 415 234 1234 |
|---|---|---|---|---|---|---|
| 992b | CALL CONTEXT AFTER APPLICATION OF RULE 970 | 954 904 567 1234 | 956 904 567 1234 | 958 FAX | 960 415 234 1234 | 962 415 234 1234 |

*Fig. 9D*

UNIVERSAL PROTOCOL CONVERSION

FIELD OF THE INVENTION

The present invention relates in general to apparatus and methods for protocol conversion between telephony systems, such as advanced intelligent networks, having incompatible telephony signaling protocols. In particular, the present invention relates to a configurable, universal signaling protocol converter, a system or network having such a protocol converter and a method of protocol conversion that enables communication between signaling protocols of two or more pieces of telephony equipment.

BACKGROUND OF THE INVENTION

In the past decade, the pace of deregulation of the telecommunications markets around the world has accelerated rapidly. Federal telecommunications liberalization legislation in the United States, the European Community's mandate that its member nations liberalize their telecommunications markets by January 1998, and the World Trade Commission's agreement on freeing trade in telecommunication's markets world wide have combined to result in a period of unprecedented growth in the global telecommunications market. New carriers are being created to compete against the old monopolies, established monopolies and carriers are merging and forming joint ventures to create global giants, and fringe market players (resellers and call back operators) are expanding their product lines and extending into new markets.

As carriers build new networks and extend existing networks to new markets, they are encountering many technological challenges which they did not face when they operated only in a single, domestic, market. One of the most significant challenges is that of managing the myriad of communications network protocols which are used in different markets. Telecom operators must interface with a variety of customer Private Branch eXchange (PBX) equipment, and must also interconnect with other operators for access and egress. Today, there are between 35 to 50 variants of base protocols. The ability of the new entrants to support customer access, local, long distance and international protocols often determines their ability to compete successfully.

Communications protocols are the "languages" that allow telecommunication equipment (switches, routers, customer premise equipment, etc.) to communicate with each other. It is essential for a new carrier to be able to support the protocols of its customers, to provide access for their existing Customer Premises Equipment (CPE), and the other networks with which it must interconnect, via switch to switch interconnections. Moreover, the creation of more advanced services, such as Intelligent Networking, requires that communication's protocols contain increasingly detailed information and the migration towards ATM (Asynchronous Transfer Method) network backbones requires the capability to support voice network protocols through data networks.

The technical solutions to this problem, that are available today, have not sufficiently met the requirements of the network operators. Traditionally, network service providers have supported protocols directly on the network switches. This was an adequate solution when the carriers operated only in a single market, but as they expand, their switches do not support the new protocols and the development time and cost for adding all required protocols to their switches are prohibitive. Voice protocol conversion solutions available in the past have been managed on a one-to-one basis which result in small, hardware based solutions. These solutions are inflexible, have limited scalability, are unstable, and do not operate as truly integrated parts of the carrier's network.

One example of the problems with the prior art is in a connection between a protocol used by Deutsche Telekom AG and another protocol, such as G1. When a party using the protocol of Deutsche Telekom AG generated a call signal and the other protocol generated a busy signal, the Deutsche Telekom AG threw away the busy signal and continued to generate the ring signal to the calling party. Rather than change their protocol, Deutsche Telekom AG used a mechanical solution of monitoring the tone.

Another example of a problem with conventional equipment arises when large multinational corporations use a first protocol, such as DPNSS, to provide a "call hold" between the company's PBX's using leased trunk lines. However, these trunks cannot be extended across national boundaries due to high expense, national regulations, and incompatible service providers. The telecom service provider used by the company determines that each country supports a similar, but not exact, Integrated Services Digital Network (ISDN) public facility signaling system. Both systems, for example, are compliant with ITU Q.931, but use two network-dependent fields in a different manner. The requirements for connectability then become:

1. Convert a DPNSS "call hold" message sequence to an ISDN message sequence for Country A;
2. Convert ISDN messages in Country A format to ISDN messages in country B format; and
3. Convert ISDN messages in Country B format to DPNSS for deliver to the remote PBX.

Consequently, a convoluted, multi-conversion process must be implemented.

Accordingly, there exists a need for a universal, simplified, but easily configurable protocol converter which can be used by many different protocol systems; that can be easily configured for new protocols and changes to existing protocols. This need has existed for a long time and has not been solved by the existing equipment.

SUMMARY OF THE INVENTION

The present invention was developed to provide a solution to protocol conversion by providing customers with a flexible, any-to-any, protocol conversion platform which is integrated in the network as a network element. This product is unique in its market and provides telecommunications service providers with new capability to quickly, and in the field, adapt their networks to the needs of a new protocol which facilitates their ability to launch new products and extend into new markets and to compete in the rapidly changing global market environment.

Accordingly, the present invention provides an intelligent signaling protocol converter that, for example, can be used for multiple Common Channel (e.g. C7 or PRI) and Channel Associated Signaling (CAS) protocol conversions and that is designed to support voice to data protocol conversions in its next generation. The present invention is a true network element that is scalable, will operate in a fault environment, and provides interfaces to network management systems typically used in a telephone company central office environment. An advantage of the present invention is that it can be programmed by a customer through an interface that allows the user to build, map, alter and logically convert between multiple protocols. Thus, the present invention offers programmability, flexibility and a dynamic environment not currently provided by traditional protocol conversion alternatives. It eliminates the need for the traditional list of supported protocols commonly associated with switches and one-to-one protocol converters by providing a library of pre-defined protocols and it is relatively easy to add new protocols and protocol variations quickly.

The present invention provides advantages in network applications where it can be used to cost effectively expand a network and deliver central office functionality such as digit manipulation, billing and intelligent network interfaces close to the end user at significantly less cost than PBXs used as network switches. As such, a protocol converter according to the present invention can be paired with any tandem switch as traffic grows and switching becomes desirable. This enables system operators to support all current and future protocols, regardless of switch capability while freeing the switch from CPU-intensive conversion routines. This also eliminates long and costly development typically necessary to accommodate protocols and feature inter-working. As a remote access node, the protocol converter would be transparent to the bearer channel thus enabling only one leg of compression all the way from the customer site to the network switch.

The present invention has significant benefits for a carrier such as enabling rapid customer interconnection of any PBX and its associated access protocol, avoiding expensive and time consuming switch development to support new protocols, and facilitating the wider distribution of access nodes through cost effective and scalable implementations. The present invention maximizes the inter-working of supplementary features (e.g. a caller identification feature and a call forwarding feature), improves operational efficiency through remote access to real time date, provides continuous call state analysis, and permits rapid fault isolation. The invention facilitates the interconnection between networks, supporting network access and egress requirements, by sitting in-between the connecting switches to convert between the core network protocols used by each network. The software can be ported to equipment developed internally or by third party vendors to manage protocol conversion internal to existing or future network elements. The application software can be distributed among many platforms and storage media, or can reside on a single computer. Finally, the software's design utilizing the universal call model facilitates the capability to map from voice protocols to data protocols to allow operators to migrate voice and data networks onto a single ATM backbone.

The present invention has significant benefits for a carrier such as enabling rapid customer interconnection of any PBX and its associated access protocol, avoiding expensive and time consuming switch development to support new protocols, and facilitating the wider distribution distrubution of access nodes through cost effective and scalable implementations. In addition, the present invention maximizes the inter-working of supplementary features (e.g. a caller identification feature and a call forwarding feature), improves operational efficiency through remote access to real time data, provides continuous call state analysis, and permits rapid fault isolation. Another advantage of the present invention is the elimination of decompression and recompression of the telephony signals at the access node thereby improving quality.

In one aspect of the present invention, a programmed general purpose digital computer receives signaling messages and logically converts the signals based on protocol definitions and customer-specified parameters into a non-protocol specific form (e.g. a generic protocol) and then converts the generic protocol into the requisite protocol of the receiving network. In this way, only one protocol converter is needed to service the expected protocols of an international telephony system, and this same converter, because it is receiving all of the incoming traffic, is capable of being used to provide valuable network usage data to generate network statistics and reports such as answer seizure ratio, call attempts, percentage failures and average holding time. In one specific environment where there is a conversion from a CAS or PRI protocol to a C7 protocol, the present invention can concentrate the signaling channels with the attendant advantages of eliminating the requirements for signaling terminals and the resulting need for costly switch expansion.

One specific embodiment of the present invention is directed to a universal protocol converter that converts the protocols of a first system to the protocols of a second system and that is comprised of an interface means for connecting with the first and with the second system; and a call instance for a call in which the call instance includes a means for converting the first protocol to a non-protocol specific representation, and then from this representation to the second protocol. This one embodiment can also include a generic state means for keeping track of the call by storing only data obtained from the non-protocol specific representations. It can also include a means for storing call context data of the generic protocol which is generated during the call, and it can include a means for manipulating the non-protocol specific representation when converting to the second protocol.

Another embodiment of the present invention is a telecommunications network that includes bearer channels and data channels and has first and second telecommunications systems having first and second protocols, respectively. The network also includes a means for converting between said first and second protocols that comprises a means for grooming the data on the data channels for data that both comes from the first and second telecommunications systems; means for converting the data to a non-protocol specific representation; means for temporarily storing the converted data; means for inter-working said temporarily stored data in accordance with a set of stored rules that depend upon the first protocol; means for converting the inter-worked data to conform with said second protocol; and means for reintroducing said converted data to said data channels of said second telecommunications system.

The present invention also includes a method by which a call control data stream of a request for bearer services is intercepted in transit between an originating communications node having a first protocol and a terminating communications node having a second protocol and is converted to a call control data stream of a terminating communications node. The method comprises intercepting the call control data stream that contains a plurality of information elements and transforming them into a non protocol specific form, storing the intercepted and transformed data elements; inter-working at least some of said stored data elements in accordance with predetermined rules; storing said inter-worked data elements; placing selected ones of said stored inter-worked data elements in the protocol of said terminating node; initiating an intermediate origination of a call control session; and using said data elements in the protocol of the termination node, by which such originally requested bearer services are obtained.

Generally speaking, the present invention is a software based, scalable, programable, means for interconnection of a plurality of heterogeneous network nodes—including, by way of example and not limitation, switching infrastructure, customer premises equipment, and intelligent network adjunct processors—to enable the resulting combination to communication and interoperate with each other in providing network services and features that would not otherwise be within the individual or collective capabilities of such heterogenous network nodes.

Other features and advantages of the invention will be set forth in, or apparent from, the following detailed description of preferred embodiments of the invention.

BRIEF DESCRIPTION OF THE DRAWINGS

FIG. 9A is a diagram illustrating data elements typically contained in a Call Context record for each Call Instance;

FIGS. 9C and 9D are schematic diagrams of selected parts of a plurality of depicted Call Instances to which the exemplary inter-working rule depicted in FIG. 9B would apply;

DETAILED DESCRIPTION OF THE PREFERRED EMBODIMENTS

Figure 1:
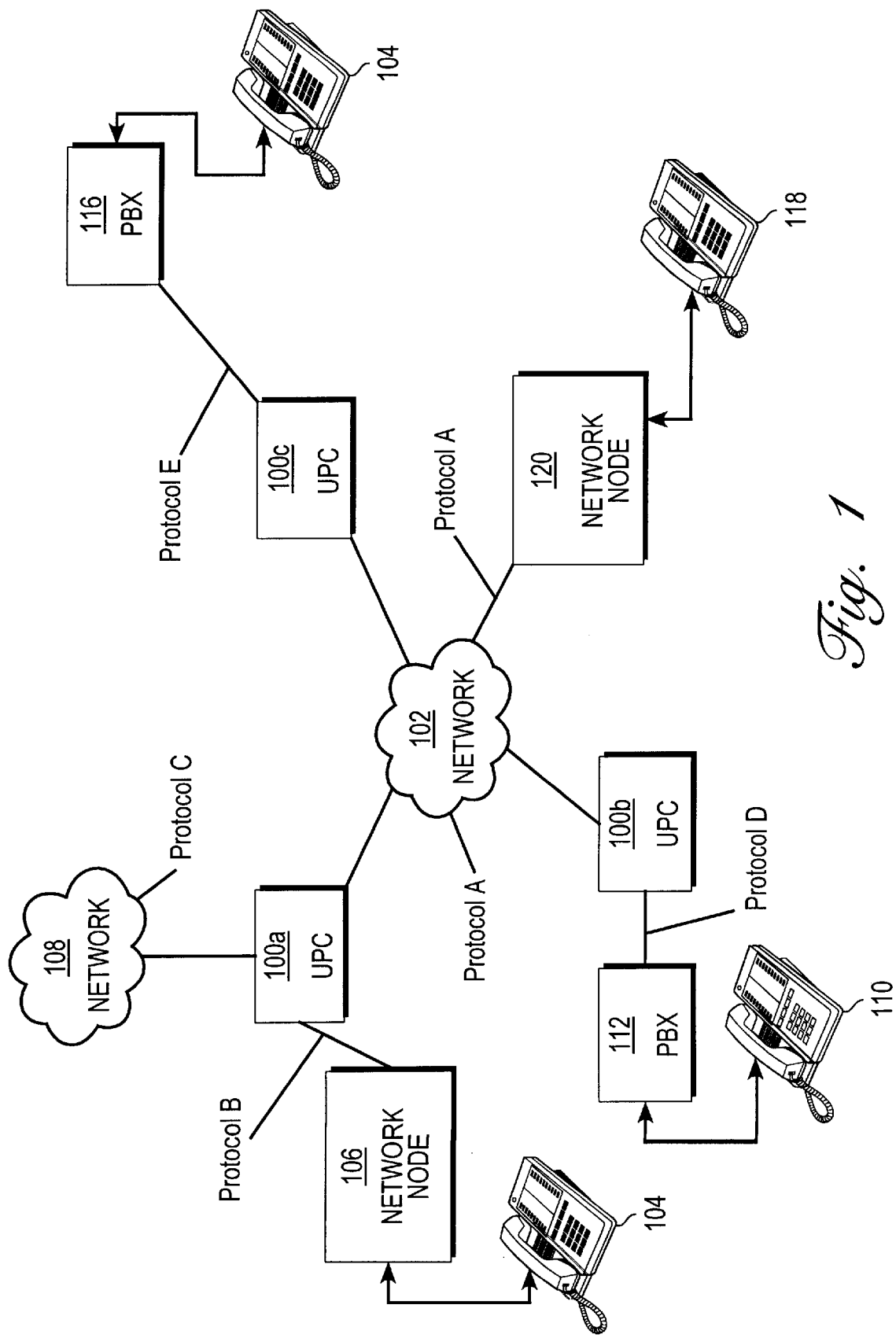
FIG. 1 is a schematic block diagram depicting an overview of the application of a Universal Protocol Converter in accordance with the present invention.

With reference now to the figures, wherein like elements are represented by like numerals throughout the several views, the basic concept of the present invention will be described. An important aspect of the present invention is the translate between heterogeneous signaling systems to provide fast, accurate connections in a reliable telephony service. Referring to FIG. 1, there is depicted an example of a communications topology illustrating some of the applications of a Universal Protocol Converter 100, according to the present invention, to support several different communications needs. Universal Protocol Converter 100 is hereinafter sometimes abbreviated as "UPC" and is further identified in FIG. 1 by a "100" along with a lower case letter to distinguish between the same UPC component that is located in a different configuration. At the center of the figure is a communications Network 102 that includes a plurality of network infrastructure comprised of switches, transmission equipment, and customer premises equipment and which for this example uses a first protocol that is designated Protocol A. A first subscriber or user 104 is connected to a first UPC, designated UPC 100a, through a Network Node 106 which supports a second protocol that is designated Protocol B. A second Network 108, which includes a plurality of network infrastructure comprised of switches, transmission equipment, and customer premises equipment, supports a third protocol that is designated Protocol C. UPC 100a, as depicted, supports communication among any of its subtending elements (comprised of Network 108, Network Node 106, and Subscriber 104) and Network 102. When used in conjunction with a second UPC, denoted 100b, UPC 100a supports communication among any of its subtending elements through Network 102 with a second User 110 served by a Private Branch Exchange (hereinafter referred to as "PBX") 112 to which it is connected and that supports a fourth protocol that is designated as Protocol D. When used in conjunction with another UPC 100c, to which they are interconnected by Network 102, UPC 100a and UPC 100b support communication among their subtending elements and a Subscriber 114, served by a PBX 116 to which it is connected and that supports a fifth protocol that is designated Protocol E. Intercommunication through Network 102 provides similar support for communications among subtending elements of itself, UPC 100a, UPC 100b, and UPC 100c with a Subscriber 118 that is connected to and served by a Network Node 120. Network Node 120 supports Protocol A and therefore no UPC is needed to communicate with Network 102 or other elements in the illustrated topology. In general, FIG. 1 illustrates multiple configurations in which the present invention facilitates communications among network elements that use different protocols.

Figure 2:
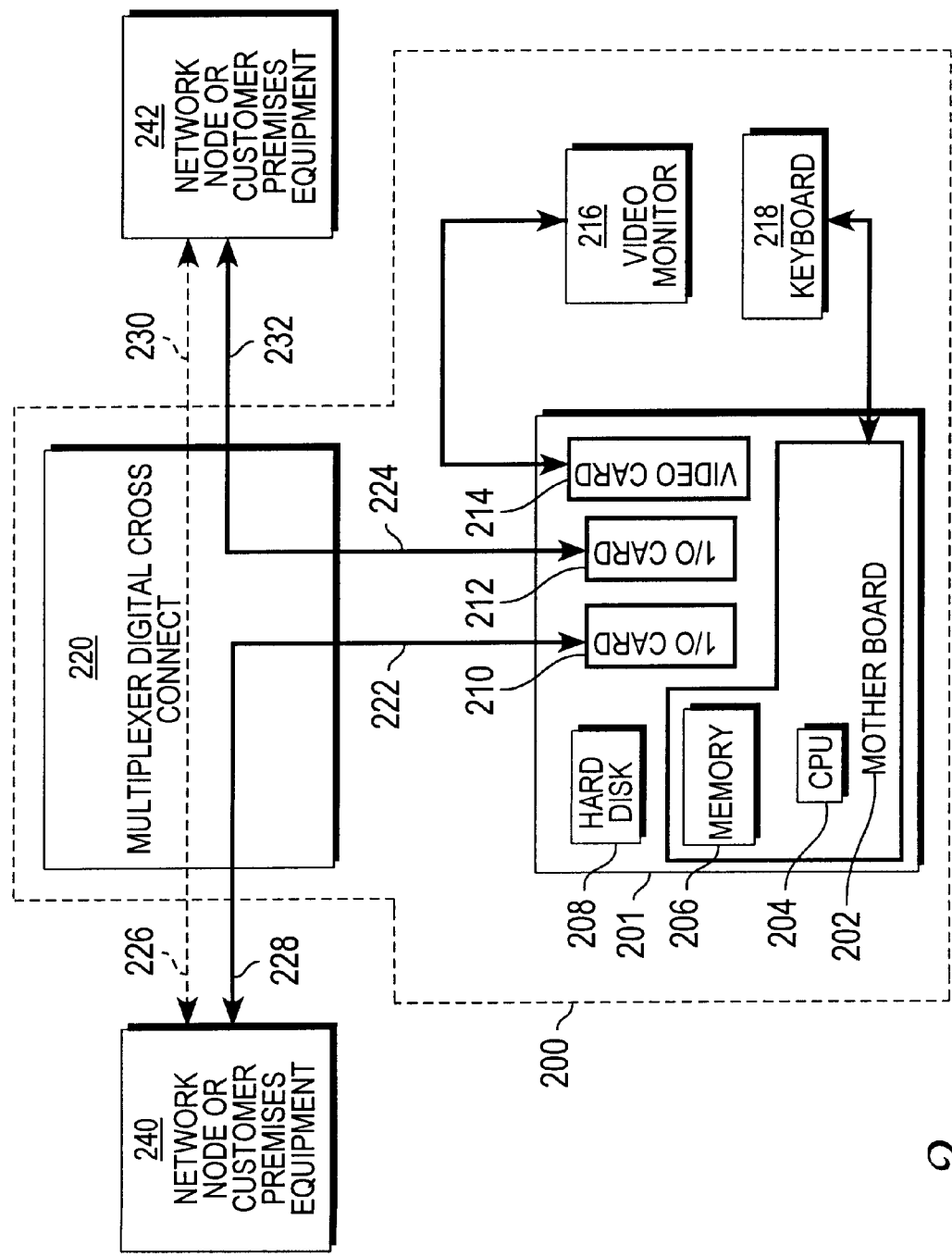
FIG. 2 is a schematic block diagram of one embodiment of the hardware utilized in the present invention.

Referring now to FIG. 2, there is depicted a particular configuration of hardware 200 in accordance with the present invention, that is one implementation of many different configurations. Hardware 200 includes a Computer 201, which serves as the host for the application software in accordance with the present invention. Hardware 200 is comprised of a motherboard 202 on which a Central Processing Unit ("CPU") 204 and a Random Access Memory ("RAM") 206 are located, and which is equipped with a Hard Disk 208 and slots for interconnection with Input/Output ("I/O") Cards 210 and 212. Such application software is resident on Hard Disk 208, and upon initialization of Computer 201 appropriate elements of the application software, along with configuration information and other data references used by the application software, are loaded into RAM 206. A Video Monitor 216, connected to a Video Card 214, and a keyboard 218, of Computer 201, permit operator interaction with the application software.

Functionality with the present invention is achieved through interception of the control signaling messages and data associated with a telecommunications network, storage of such control signaling messages and data in an internal format, manipulation of such control signaling messages and data according to inter-working rules applicable to the specific protocols supported, and transmission of such resulting control signaling messages and data to the destination.

In FIG. 2, the hardware 200 of the present invention also includes a conventional Multiplexor/Digital Cross Connect ("MUX") 220 connected to computer 201 with digital circuits that include control channels 222 and 224. For simplification, only one bearer channel 226 and only one control channel 228 are depicted to connect MUX 220 to a network node or customer premises equipment 240, and only one bearer channel 230 and only one control channel 232 are depicted to connect MUX 220 to a Network Node or customer premises equipment 242, respectively.

Those skilled in the art recognize that digital facilities used in communications networks general conform to an acredited standard and are comprised of a plurality of bearer channels and typically one control channel, all of which are Time Division Multiplexed onto a single physical circuit. The role of the MUX 220 then is to receive the incoming circuits from Network Elements 240 and 242 and groom off the control channels to be passed in an individual time slot of a digital circuit (for example either ANSI T1 or ETSI E1 standard form), to the I/O Cards 210 and 212 of the host computer 201. Such grooming is represented by control channel 222 as the carrier of information from control channel 228, and control channel 224 as the carrier of information for control channel 232. In the associated discussion regarding FIG. 5, that follows, an example involving multiple bearer channels and control channels is provided.

An exemplary complement of hardware that will support the illustrated embodiment of the present invention would include: a Sun™ ULTRA SPARC™ computer, equipped with one (or more) 167 Mhz (or higher) CPUs, 128 Megabytes (or more) of RAM, two 4 Gigabyte Hard Disks; two Newbridge Sprite™ I/O Cards, a Monitor and Keyboard; and one Newbridge Main Street™ Multiplexor.

Figure 3:
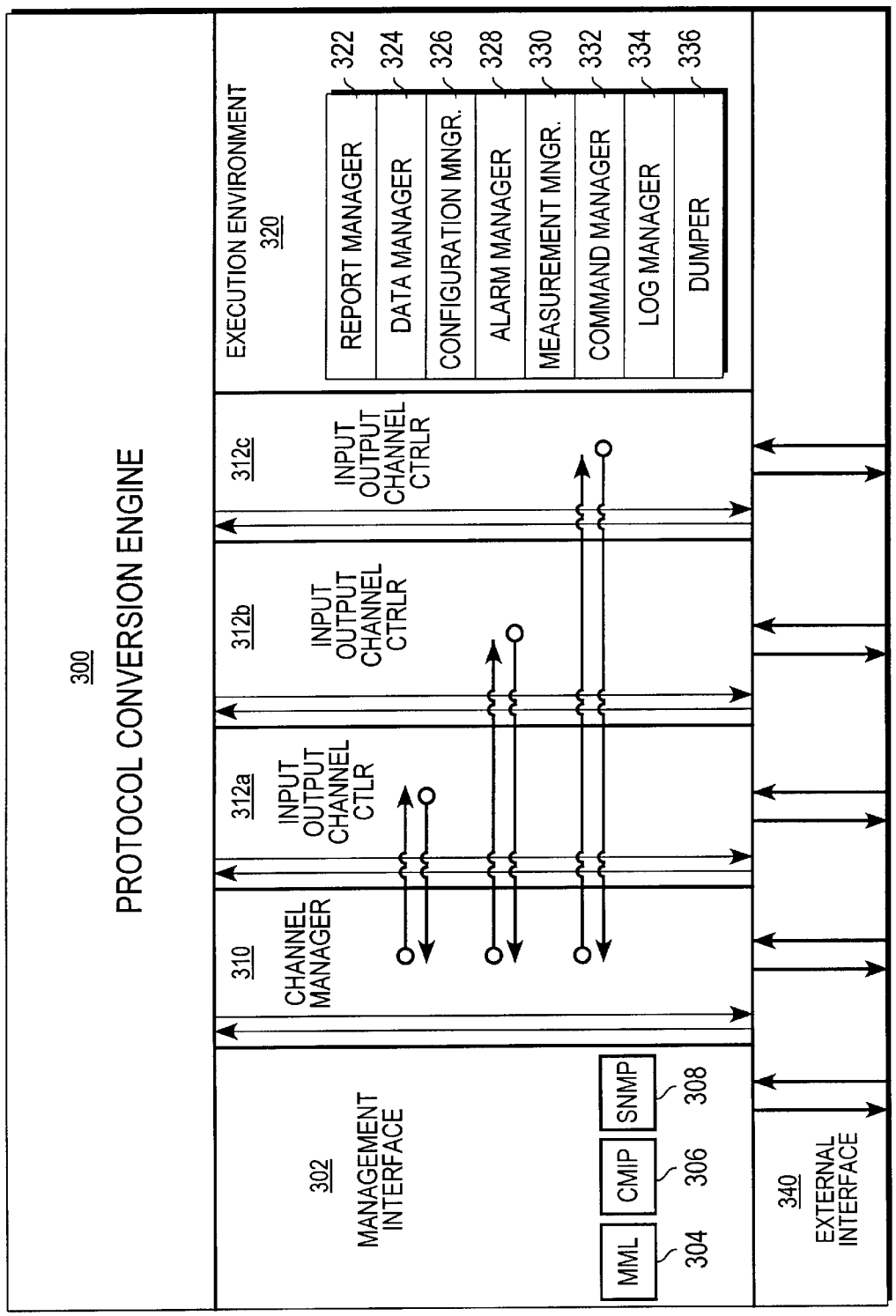
FIG. 3 is a schematic block diagram of the architecture of one embodiment of the software in the present invention.

Referring to FIG. 3 wherein a schematic diagram of the architecture of the present invention is presented, the UPC 100 is comprised of four major software architectural elements—a Protocol Conversion Engine 300, a Management Interface 302, a Channel Manager 310 (and its associated I/O Channel Controllers 312), and an Execution Environment 320. The Management Interface 302 and the I/O Channel Controllers 312 communicate with external systems and interconnected Network Nodes and/or Customer Premises Equipment through an External Interface 340.

The Protocol Conversion Engine 300 is a central part of the present invention, within which the actual inter-working of signaling messages occurs. The Execution Environment 320 functions as the Software Framework within which the Protocol Conversion Engine 300 operates. A Report Manager 322 provides for the communication of reports through the manmachine interface. A Data Manager 324 provides for management of the databases required for operation. A Configuration Manager 326 addresses the configuration needs of the Host Computer as well as the application software. An Alarm Manager 328 provides for the registration of and tracking and reporting alarm conditions generated by hardware and software. A Measurement Manager 330 provides for the capture of statistics concerning the operation of the system, in the context of the present invention, and calls processed. A Command Manager 332 supports the Management Interface 302 that permits interaction with the functionality of the applications software. A Log Manager 334 provides the services for logging of activities and messages within the applications software. A Dumper 336 is a multi-purpose utility that collects statistical information, information about call related data and other data about certain key hardware and software events and prepares them for processing by an operating system (e.g. Unix) and other external applications.

The Channel Manager 310 is responsible for coordination of the communications between the Protocol Conversion Engine 300 and the individual I/O Channel Controllers 312 that provide communication with the interconnected Network Nodes, Customer Premises Equipment, and/or External Applications Systems. The Management Interface 302 provides the mechanism for operator interaction with the UPC 100 as would be required for configuration data entry or modification, alarm acknowledgment or response, and network element management functions traditionally associated with communications network elements. Depicted in FIG. 3 are three principal management interfaces, that include a Man Machine Language ("MML") 304—an interactive interface generally conforming with the provisions of ITU Recommendation Z.300; a Common Management Interface Protocol ("CMIP") 306—a protocol interface generally conforming with the provisions of ITU Recommendation X.720; and a Simple Network Management Protocol ("SNMP") 308 a protocol generally conforming with the provisions of RFC-1157 of the Internet Engineering Task Force.

Figure 4:
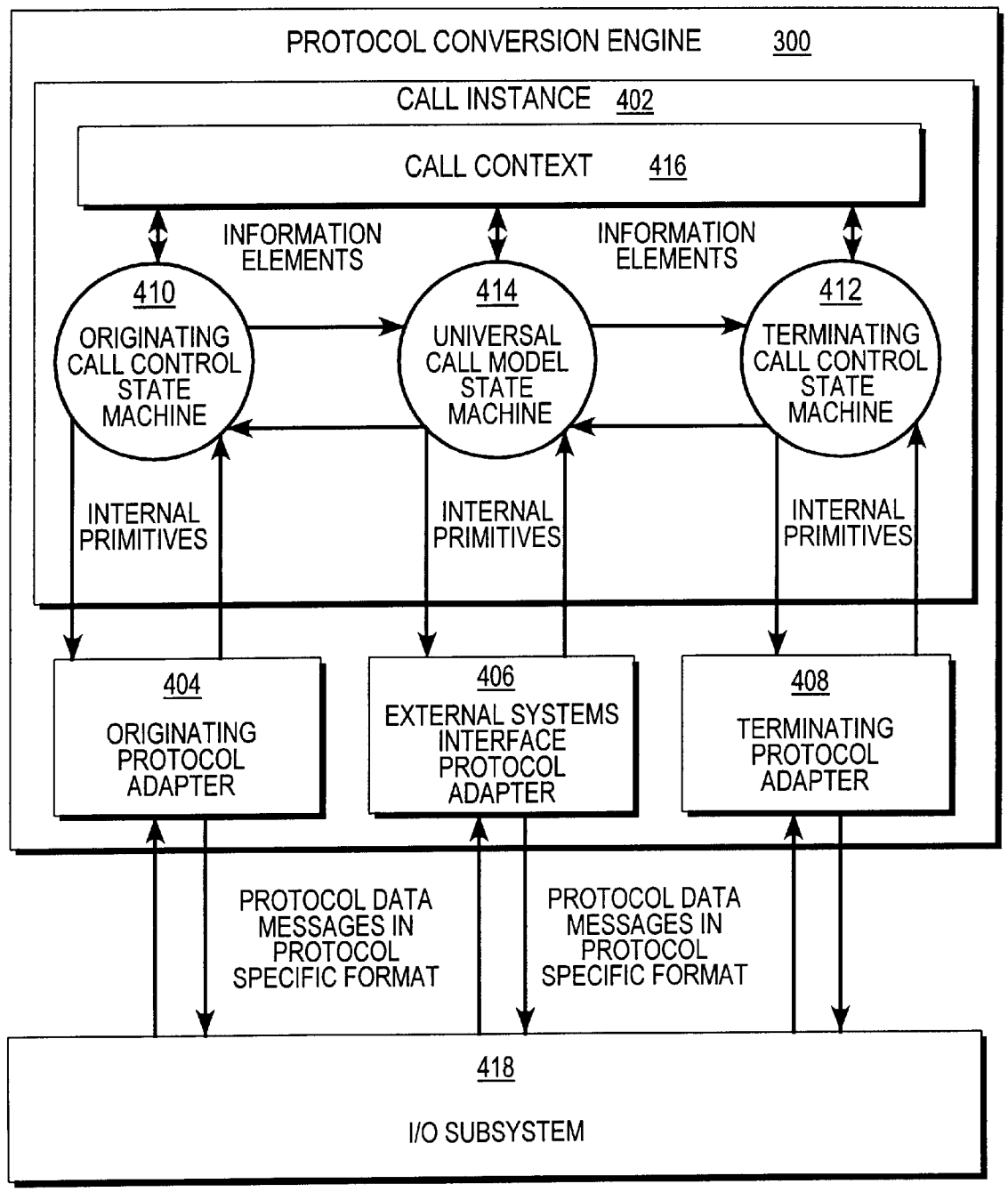
FIG. 4 is a high level schematic diagram depicting a logical view of the elements of the Universal Protocol Converter in accordance with the present invention.

Referring now to FIG. 4, a diagram of the Protocol Conversion Engine 300 is schematically depicted. Comprised of a Call Instance 402 and a plurality of Protocol Adapters 404, 406, and 408, Protocol Conversion Engine 300 interfaces with external equipment, and therefore with interconnected networks and network elements, through a conventional I/O (Input/Output) Subsystem 418. It should be noted that Protocol Adapter 406 is a special form of Protocol Adapter, and unlike Protocol Adapters 404 and 408, it supports the interconnection of external systems that may be involved in real time call control (such as Transaction Control Application Part—TCAP—communications with a C7 network Service Control Point—SCP) as well as those that may not be involved in real time call control (such as use of a proprietary protocol in communicating with a Fraud Control System). Protocol Adapters 404 and 408 are the mechanism by which calls are instantiated, and responsible for maintaining the environment in which the Call Instance 402 executes. External Systems Interface Protocol Adapter 406, operating in a manner similar to Protocol Adapters 404 and 408, provides a means for communicating to external systems and/or entities. In addition, Protocol Adapter 404 acts as the mechanism that provides an interface between the Originating Call Control ("OCC") 410 and the I/O Subsystem 418 and similarly, Protocol Adapter 408 act as the mechanism that provides an interface between the Terminating Call Control ("TCC") 412 and the I/O Subsystem 418. Call Instance 402 is comprised of three functional state machines—two Call Control State Machines, one designated for an originating call control OCC 410, one designated for a terminating call control TCC 412; and one designated as a Universal Call Model State Machine ("UCM") 414. Call Control State Machines 410 and 412, working in conjunction with Protocol Adapters 404 and 408, respectively, convert signaling messages received from originating and terminating networks through I/O Subsystem 418 to non protocol-specific Internal Primitives.

Internal Primitives are the events that are passed among a call control state machine (i.e. Originating Call Control 410 or Terminating Call Control 412), the Universal Call Model state machine 414, the originating or terminating protocol adapter 404 and 408, and the External Systems Interface Protocol Adapter 406, respectively. An event in this context is a stimulus delivered to or from a state machine that may dictate a particular action, an example of which is a signal sent in response to a timer expiring. Internal Primitives are defined depending on how the protocol control is implemented, and are vehicles for carrying signaling information data and/or signals.

In the exemplary model depicted, Call Instance 402 is servicing a call that is originating from one network element operating with a first protocol and terminating on another network element operating with a different protocol. Using a process and information obtained as more fully described below with respect to FIGS. 7, 8A, and 8B, Protocol Adapters 404 and 408 respectively take the signaling messages coming from or going to the originating party and take the signaling messages coming from or going to the terminating party and parse and assemble the signaling messages.

Call Instance 402 also includes a reserved portion of memory which is called Call Context 416. Call Context 416 is a collection of data elements that describe the contents of the messages passed through Protocol Conversion Engine 300. The description is in a physical representation-independent, protocol-independent form. For each active call, there is exactly one instance of Call Context 416. The data elements of Call Context 416 are accessible to both OCC 410 and TCC 412, as well as protocol independent UCM 414 for the duration of the call. Together with the current state of the call, Call Context 416 completely specifies the state of the call, so that both OCC 410 and TCC 412 have all information that is needed and such that they communicate with UCM 414, rather than directly with each other.

State machines 410,412 and 414 are comprised of states, primitives, alternatives, decisions, saves, and procedures. In addition to addressing the states of a call, the present invention addresses signaling messages within a call, that are defined as data structures that contain information passed between two connection points. Although each base protocol uses a different way of specifying the structures of its messages, in all protocols a message is comprised of header information and a series of discrete information elements. In particular UCM 414 is comprised of states, primitives, alternatives, decisions, saves, and procedures that are invoked in response to Internal Primitives sent by OCC 410 and TCC 412 in such a way that a Call Instance 402 is processed in a protocol independent fashion. In this fashion, UCM 414 acts as an intermediary between OCC 410 and TCC 412 by utilizing its knowledge of all possible Internal Primitives it may get from OCC 410 and/or TCC 412, for which UCM 414 might have to send to the opposite side or to respond to the side of the call sending the Internal Primitive. Specifically, in the case of receiving an Internal Primitive from OCC 410, the UCM 414 determines the Internal Primitive that must be sent to TCC 412; and, where applicable, sent to OCC 410 as may be required in the case where OCC 410 needs to know the state of the call. Internal Primitives may contain state signals and Information Elements and, therefore, in fulfilling the role described, UCM 414 may perform manipulation of certain data elements within the Internal Primitives and such manipulation is accomplished via population of Call Context 416 and/or extraction from Call Context 416 of Information Elements. As one skilled in the art will recognize, there is not necessarily a one-to-one correspondence between the Information Elements and/or states of one protocol versus those of another and therefore, another function of UCM 414 is to recognize the need for and provide for the population of Call Context 416 with required default or other required values.

It should be noted that, for purposes of clarity in description of the functionality, Call Control State Machines 410 and 412 and Protocol Adapters 404 and 408 have been provided with function labels "Originating" (including "OCC") and "Terminating" (including "TCC"). The association of "Originating" or "Terminating" functionality with any element is only applicable for the duration of a single call. Protocol Adapter 404 and Call Control State Machine 410 may provide "Originating" functionality in one call, and "Terminating" functionality in another. Similarly, Protocol Adapter 408 and Call Control State Machine 412 may provide "Originating" functionality in one call, and "Terminating" functionality in another.

Figure 5:
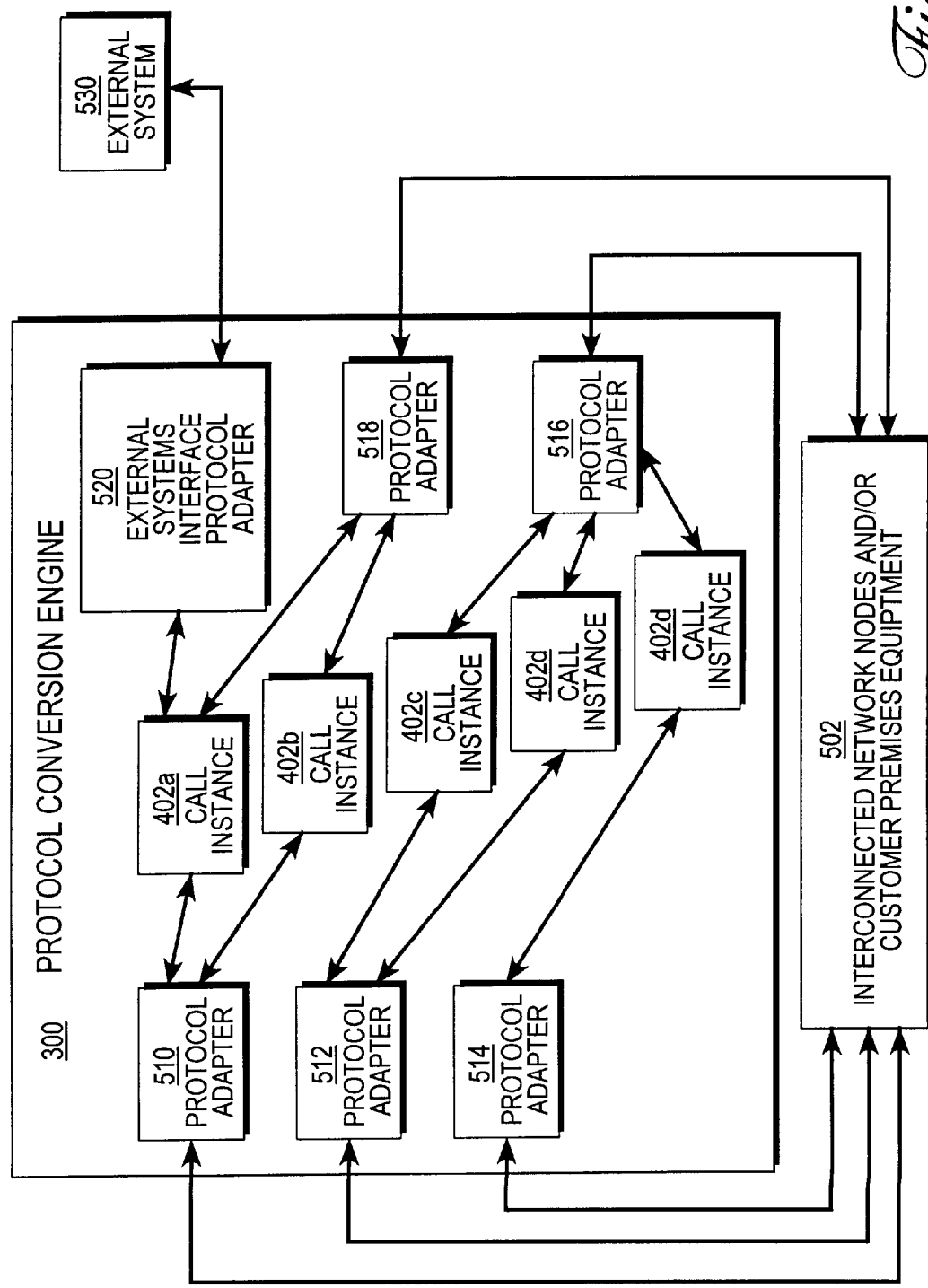
FIG. 5 is schematic diagram illustrating the application of the logical elements depicted in FIG. 4 in the simultaneous processing of a plurality of calls.

Referring now to FIG. 5, wherein an exemplary depiction of the Protocol Conversion Engine 300 is presented, and within which five individual Call Instances 402a, 402b, 402c, 402d, and 402e are illustrated. Each Call Instance, created by the origination of a call from within the Interconnected Network Nodes and/or Customer Premises Equipment 502, is depicted as associated with one of five Protocol Adapters 510, 512, 514, 516, and 518, each of which supports a unique protocol or protocol family (comprised of a group of protocols which differ only by minor variance). In addition, an External Systems Interface Protocol Adapter 520 is shown supporting an External System 530 in conjunction with the requirements of Call Instance 402a. The exemplary depiction of this singular association is not a limitation of the present invention in which plurality of call instances may be associated with the External Systems Interface Protocol Adapter 520. Within this exemplary depiction Protocol Adapters 510, 512, 516, and 518 are shown as supporting multiple Call Instances 402a, 402b 402c, 402d, while Protocol Adapter 514 is shown as supporting only one Call Instance 402e. However, as it would be appreciated by those skilled in the art, the limitations depicted in FIG. 5 of a particular Protocol Adapter being connected to one or two Call Instances, are for the purpose only of display and are not a limitation that exists within the present invention that permits any Protocol Adapter to support one or many Call Instances.

Figure 6:
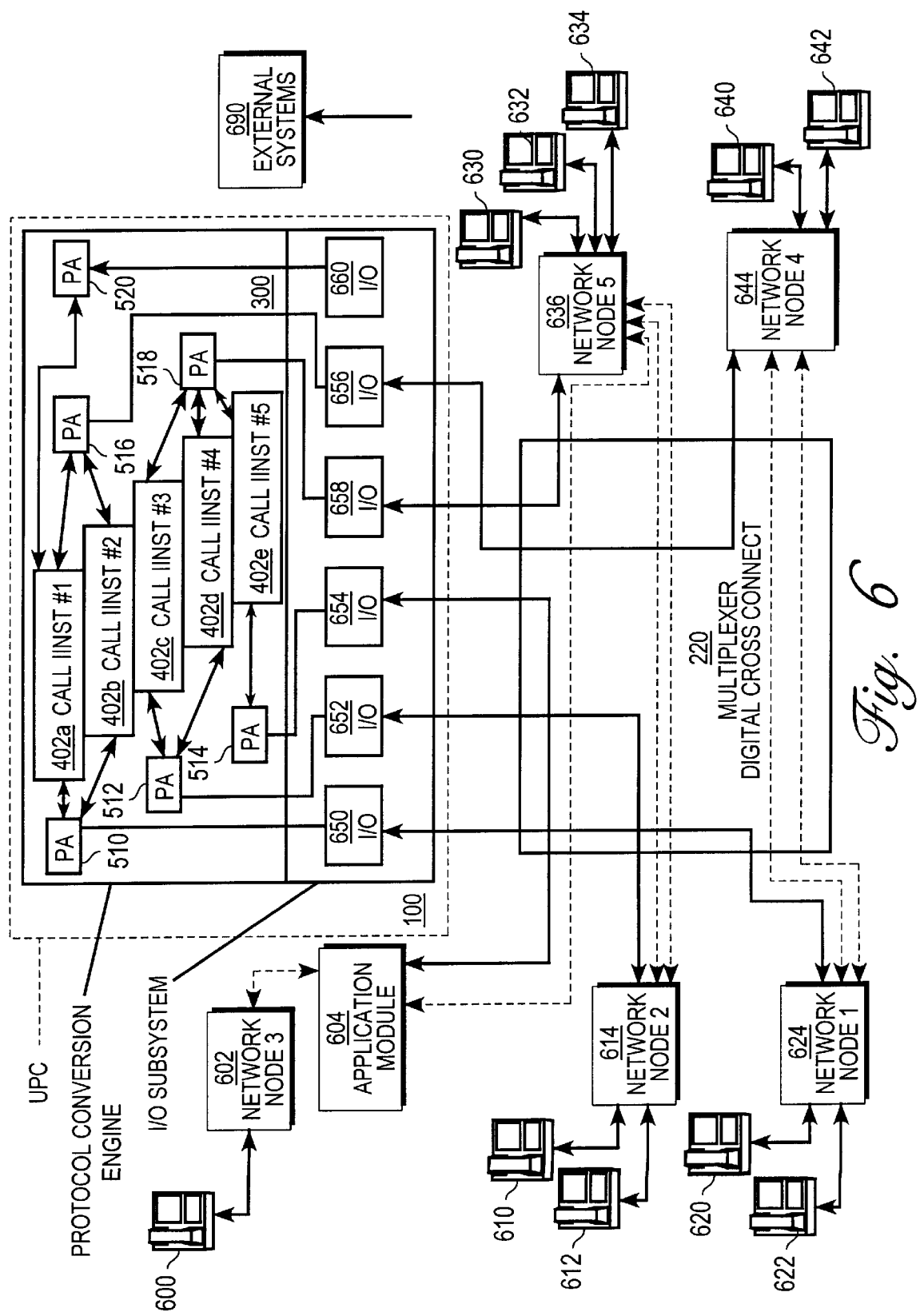
FIG. 6 is an exemplary schematic diagram illustrating an implementation of the logical elements of the present invention depicted in FIG. 5 in conjunction with other network elements.

Referring now to FIG. 6 there is a schematic depiction of one possible network topology that would correspond to the example of multiple call instances as described in FIG. 5. In this exemplary topology, UPC 100, comprised of Protocol Conversion Engine 300 and I/O subsystem 418), is configured to support five different telecommunications protocols as required by five heterogenous Network Nodes 602, 614, 624, 636, and 644, to which a plurality of subscribers 600, 610, 612, 620, 622, 630, 632, 634, 640, and 642 are connected, and one External System 690. Protocol Adapters, a plurality of which are shown in FIG. 6 and abbreviated "PA" at 510, 512, 514, 516, and 518, provide support for each of their particular protocols. External Systems Interface Protocol Adapter 520 provides support for the requirements of External System 690 and communicates with External System 690 through an I/0 Card 660.

More specifically, UPC 100 has been configured to support conversion between the protocols used by a Network Node 1 624 and a Network Node 4 644; a Network Node 2 614 and a Network Node 5 636; a Network Node 3 602 and Network Node 5 636. It should be noted that this is only one of many possible topologies, and it should not be inferred that there is any limitation in the mapping of one protocol to another.

For example, a Subscriber 600 is served by Network Node 3 602 that uses a Channel Associated Signaling ("CAS") protocol. A CAS Application Module 604 is connected to Network Node 3 602 and facilitates conversion between a conventional Channel Associated Signaling protocol and a conventional Common Channel Signaling protocol. CAS Application Module 604 functions by decoding the in-band tones and creating control messages that represent the tones and placing such control messages on a separate control channel. Similarly, control messages received on the separate control channel are converted to tones that are injected into the bearer channel. It should be noted that circuits using CAS may be either analog or digital, and therefore the "tones" would be either analog tones or the digital representation of such tones, according to the specific type of facility. Thus, the bearer channel output from 602 is split into a bearer channel (shown in dashed lines) and a control channel (shown in solid lines) as it leaves the CAS Application Module 604. While the bearer channel passes through the MUX 220, the control channel is groomed into an I/O Card 654 and then passes to a PA 514. From there the control channel passes to Call Instance 5 402e and thence to PA 518, to an I/O Card 658, and finally to Network Node 5 636 where it is directed to any of Subscribers 630, 632 or 634 according to the dialed digits. While for purposes of describing this example call, the traditional convention of moving from left to right on the diagram has been used, the present invention has no such limitations and is fully bi-directional. Therefore, any of Subscribers 630, 632 or 634 could have originated the call to Subscriber 600, in which cases the call processing would follow the previously described path, in reverse.

It should be further noted that for purposes of clarity FIG. 6 depicts a plurality of additional separate I/O Cards 650, 652, and 656. Subject to the capabilities of the specific I/O Card used in an embodiment, there is no limitation or requirement in the present invention that there be a one-to-one relationship between the number of supported protocols, and the number of I/O cards. In fact, one of the functions provided by MUX 220 is to allow the aggregation of control channels from a number of circuits into time-slots of a single circuit. Thus, in the example of FIG. 6, it would be possible to substitute a single I/O Card one or more of I/O cards 650, 652, 654, 656, and 658, by simply using a different timeslot within the digital circuit that connects MUX 220 with the UPC 100. For reasons of redundancy most communications carriers would, however, use at least two I/O cards, and would balance the load between them.

A limitation of the exemplary embodiment depicted in FIG. 6 is the fixed correlation between protocols for which inter-working conversion is supported. This fixed correlation is the consequence of the "pass through" in the MUX 220 of the Bearer Channels between Network Nodes. An alternative embodiment that would not be subject to such limitation may be created by replacing MUX 220 with a switching device under control of the UPC 100. One method for effecting such control would be through use of the External Systems Interface 660. A second alternative embodiment that would not be subject to such limitation may be created by replacing MUX 220 with a Dynamically Reconfigurable Digital Cross Connect system that is capable of having its mapping dynamically changed by remote control, and effecting such remote control, for example, through use of the External Systems Interface 660 of the UPC 100. To depict these alternative embodiments, MUX 220 would simply be replaced by a symbol or an object representing an appropriate, conventional switch; or, in the case of the other alternate embodiment, to show control line connections between External Systems 690 and a symbol or object representing the remote controllable digital cross connect that replaces the MUX 220. As those skilled in the art will recognize, the facilities carrying bearer channels in Non Facility Associated Signaling ("NFAS") networks—such as ETSI C7 and ANSI SS7—are often separate from the facilities containing the control channels. In the previously described preferred embodiment and the two alternatives presented, the NFAS bearer channels would not necessarily have to pass through MUX 220; however, the NFAS signaling channels would, allowing the present invention to support NFAS protocols.

Figure 7:
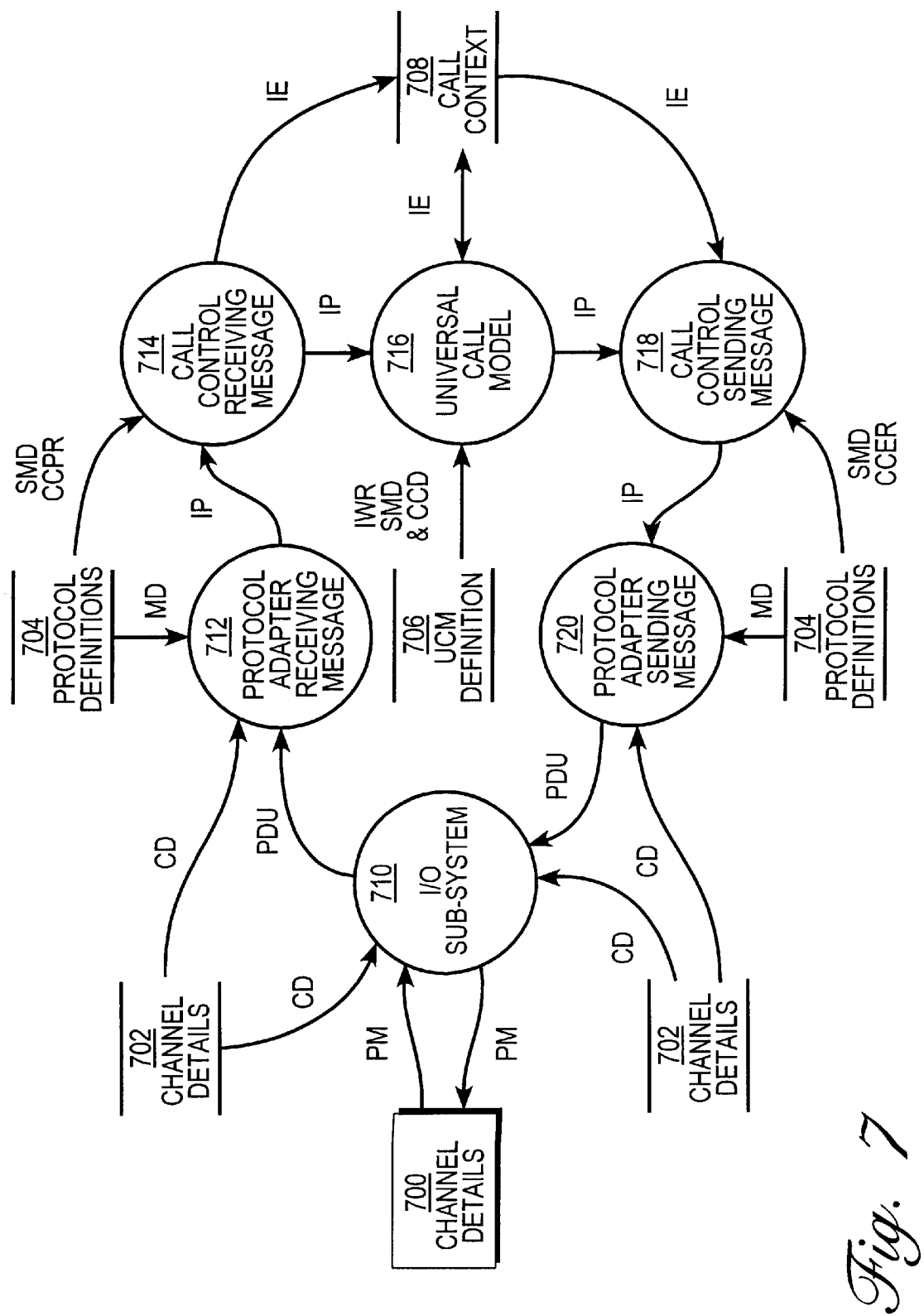
FIG. 7 is a schematic process diagram illustrating the relationship among the elements of the Universal Protocol Converter, in accordance with the present invention, in terms of the exchange of Protocol Data Units ("PDU"), Internal Primitives ("IP"), Information Elements ("IE"), State Machine Definitions ("SMD"), Call Context Definitions ("CCD"), and other processing rules that are exchanged by said elements.

Referring now to FIG. 7, a high level illustration of the present invention has been depicted using the Data Store and Process Flow conventions of the Yourdon-DeMarco Software Engineering methodology. For this reason the call-out numbers used in this diagram do not repeat previously assigned call-out numbers for items with the same name. Data stores, indicated by the dual horizontal black bars, are comprised of information that exists in a plurality of files stored within an appropriate medium or media—e.g. hard disk, or random access memory. In the present invention, the Channel Detail Data Store 702 (depicted within this figure in two places for purposes of clarity) is comprised of configuration information about the communications facilities that are connected through the Network Interface 700 to the present invention. Such configuration information includes the logical identification of channels from the interconnected Network Node or Customer Premises Equipment, and identification of time slots used in the physical facilities connecting MUX 220 and the UPC 100.

As was illustrated in FIGS. 2, 5 and 6 each originating bearer channel has a corresponding mate. This is because the exemplary embodiment of the present invention does not interrupt the flow of the bearer channel. In the previously mentioned alternate embodiments the mapping between originating and terminating bearer channels, and therefore the mapping of the required protocol conversion, is accomplished by Channel Detail Data Store 702 containing information that mapped groups of channels. The Protocol Definition Data Store 704 (depicted within this figure in two places for purposes of clarity) is comprised of information about the communications protocols to be supported by the specific embodiment of the present invention. Protocol Definition Data Store 704 is a library of information about the communications protocols, and includes Message Definitions ("MD"), State Machine Definitions ("SMD"), Call Context Population Rules ("CCPR"), and Call Context Extraction Rules ("CCER"). Message Definitions are the collection of information about messages including format, content, and coding as would be required for a software process to receive, analyze, and reconstruct messages, or a state machine to recognize and respond to signals. State Machine Definition are the collection of information that describe all possible states and the process flow of operation among such states that are required to instantiate and operate a state machine. Call Context Population Rules are the collection of rules relative to formatting and placing Information Elements in Call Context 416. Call Context Extraction Rules are the collection of rules relative to extracting Information Elements from Call Context 416. The UCM Definition Data Store 706 contains information necessary to instantiate logical instances of calls, including Call Context Definitions (i.e. the templates for creation of Call Context 708 data), State Machine Definitions for the Universal Call Model 716, and Inter-working Rules ("IWR"). Inter-working rules define specific logic that is used to process Internal Primitives flowing between Call Control State Machines 714 or 718 and the Universal Call Model State Machine 716.

An advantage of the present invention is the requirement that the author of a rule or rules need only be knowledgeable of the relationship between a single communications protocol and the universal protocol represented in the Universal Call Model 716. The consequence of such advantage is that new protocols can be added individually, and at different times as required. Call Context Data Store 708 is unlike the other, permanent reference Data Stores depicted in this figure, as it represents a temporary Data Store. This temporary Data Store contains the information required by the various state machines in processing of a single instance of a call. The Call Context Data Store 708 only exists for the duration of the associated call instance. In the preferred embodiment of the present invention, Data Stores 702, 704, and 706 reside in an appropriate storage medium or media. In a preferred embodiment of the present invention, copies such information are copied to random access memory at time initialization so as to enable rapid use by the software.

Unlike previous figures that specifically identify an "originating" and a "terminating" element, FIG. 7 recognizes the inherent bi-directional nature of communications control. Therefore, the protocol adapter processes, depicted within circles, are labeled as Protocol Adapter Receiving Message 712 and Protocol Adapter Sending Message 720, respectively. In the same manner, the processes comprising the Call Control State Machines 714 and 718, are labeled as Call Control Receiving Message and Call Control Sending Message, respectively.

The process flow of the handling of a new call by the present invention is traced by starting at the Network Interface 700 which represents the point of interconnection with the present invention provided by the I/O Cards, as previously described. An incoming Protocol Specific Message (designated by the PM on the interconnecting arrow) is received at 700 and passed to the I/O Sub-system 710. Using Configuration Data (as denoted by the CD on interconnecting arrows) from the Channel Detail Data Store 702, the I/O Sub-system transforms the Protocol Specific Message into Protocol Data Units (denoted as "PDU" on the interconnecting arrows) that are sent to the Protocol Adapter Receiving Message 712. Using Configuration Data (CD) from Channel Detail Data Store 702 to identify the incoming protocol, the mate of the incoming channel, and the protocol of the outgoing channel, and Message Definition information (designated by the MD on the interconnecting arrows) from the Protocol Definition Data Store 704, the Receiving Protocol Adapter instantiates a new Call Instance. As depicted in 402 of FIG. 4, the new Call Instance is comprised of three state machines 714, 716, and 718 and a Call Context 708. At the time of this instantiation, Call Control Receiving Message 714 and Call Control Sending Message 718 are provided with State Machine Definitions, Call Context Population Rules, and Call Context Extraction Rules from the Protocol Definition Data Store 704. Protocol Adapter 712 then sends Internal Primitives (designated by the IP on the interconnecting arrows) to a newly instantiated Call Control Receiving Message 714 where, using the Call Context Population Rules, Control Receiving Message 714 formulates Information Elements (designated by IE on the interconnecting arrows) that are written to the associated Call Context 708. Call Control Receiving Message 714 also sends appropriate state signals contained within Internal Primitive (designated by IP on the interconnecting arrows) to UCM 716. UCM 716 makes use of the Inter-working Rules (designated by "IWR" on the interconnecting arrows), State Machine Definitions (designated by SMD on the interconnecting arrows), and Call Context Definitions (designated by CCD on the interconnecting arrows) received from UCM Definition Data Store 706 at the time of Call Instance instantiation, and Information Elements in Call Context 708 to manipulate existing and/or create new Information Elements and write them to Call Context 708. UCM 716 then signals (through and Internal Primitice) Call Control Sending Message 718 which, using Call Context Extraction Rules, extracts the Information Elements from Call Context 708 to formulate Internal Primitives for transmission to a Protocol Adapter Sending Message 720. Protocol Adapter Sending Message 720 then uses Configuration Data from the Channel Details Data Store 702 and the received Internal Primitive to send a Protocol Data Unit to the I/O Sub-system 710. I/O Sub-system 710 then sends a Protocol Message to Network Interface 700 associated with the mate of the incoming channel.

The same logic is used to process messages between the Originating and Terminating network elements. In the preceding example an incoming message from the Originating Network Node was traced, and Call Control Receiving Message 714 corresponds to OCC 410 as referenced in FIG. 4, and Call Control Send Message 718 corresponds to TCC 412 as referenced in FIG. 4. Similarly, Receiving Protocol Adapter 712 corresponds to the Protocol Adapter associated with the Protocol being used by the Originating Network Node, and Protocol Adapter Sending Message 720 corresponds to the Protocol Adapter associated with the Protocol being used by the Terminating Network Node.

For a response message from the Terminating Network Node, the process flow of the example remains valid; however, Call Control Receiving Message 714 corresponds to TCC 412 in FIG. 4, and Call Control Sending Message 718 corresponds to OCC 410 in FIG. 4. In addition, Protocol Adapter Receiving Message 712 corresponds to the Protocol Adapter associated with the Protocol being used by the Terminating Network Node, and Protocol Adapter Sending Message 720 corresponds to the Protocol Adapter associated with the Protocol being used by the Originating Network Node.

Figure 8A:
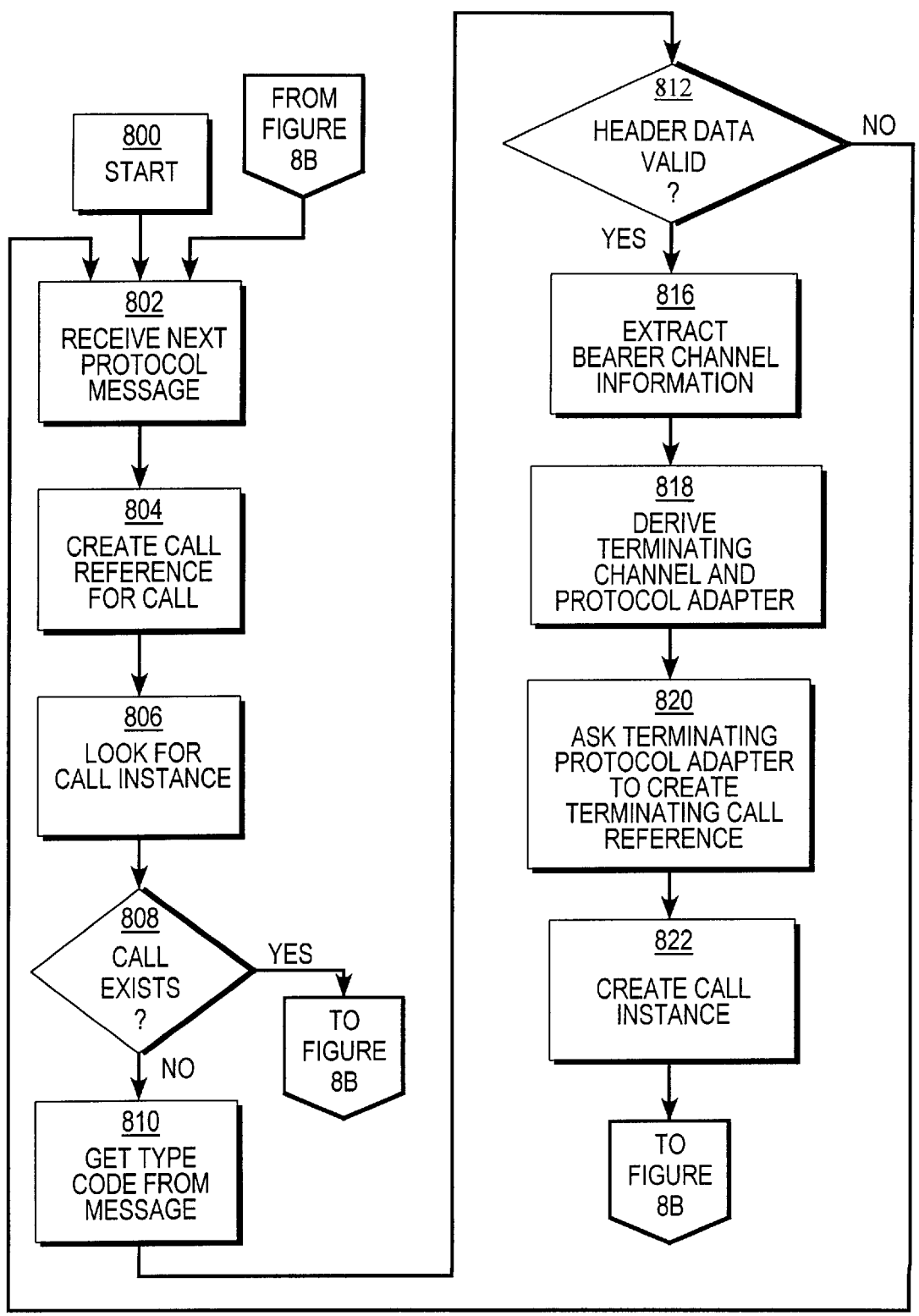
FIGS. 8A and 8B comprise a general flow chart illustrating the process by which a Protocol Adapter performs signaling message translation between external communication and/or application protocols and Internal Primitives specific to the Universal Protocol Converter in accordance with the present invention.
Figure 8B:
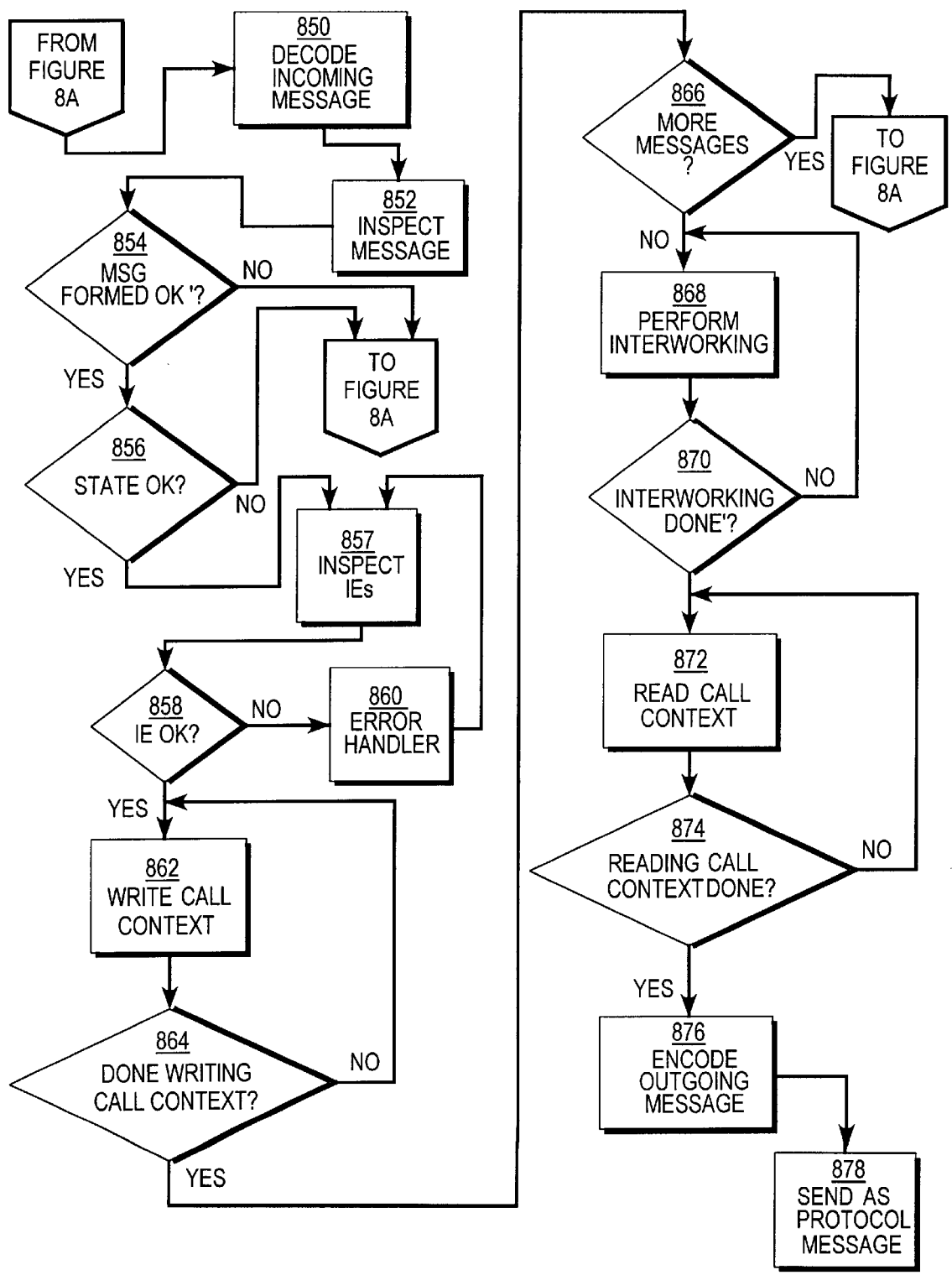

With reference now to FIGS. 8A and 8B, a high level flow chart of the internal process flow of a part of the present invention illustrates the manner in which protocol specific signaling messages are received, converted into a generic internal UPC format, processed and manipulated as necessary in the circumstances and converted again to protocol specific signaling messages that are transmitted.

The process depiction begins at a point designated Start 800 where a message is received at the UPC. A protocol specific signaling message is received from the event handler of the present invention, depicted at 802 in the process flow. The program logic then develops an internal call reference identifier 804 from data in the incoming signaling message and attempts to determine if this call reference already exists at 806.

If at a decision point 808 the call is determined to exist, processing proceeds at 850 as described in conjunction with FIG. 8B. If at decision point 808 it is determined that the subject call is not found, this means that this is a new call that must be instantiated. The program logic then proceeds at 810 to inspect the incoming signaling message to ascertain the type of message and at 812 conducts a fundamental check of the message header. If an error to is detected, an appropriate error message is generated and sent to the originating side of the call and control is returned to 802. If no error is detected, the originating bearer channel identification is extracted at 816. Processing continues at 818 by deriving the originating signaling channel identifier, the terminating bearer channel identifier, and the terminating signaling channel identifier—and thus the terminating protocol adapter. It should be noted that a "channel identifier", whether signaling or bearer and whether originating or terminating, may be associated with one channel or a plurality of associated channels.

Subsequently at 820, the program logic asks the terminating protocol adapter to create a call reference and insert the new call reference into the internal call map. If the processing occurs normally to this point, a new call is instantiated at 822.

Refering now to FIG. 8B, processing then continues with an incoming Internal Primitive, as described in conjunction with FIG. 7, containing a signaling message, arriving from the originating side of the call to be processed. The message is decoded through program logic 850 that, using the originating side protocol definition from Data Store 704 and cooperating with other internal program logic, decodes the message.

Once the message is decoded at 850 using the Protocol Definitions as from the Data Store at 704, the message is inspected at 852 to determine whether or not the message is correctly formed, as determined at 854. If not, this means that the message received is an unknown or unintelligible message. As indicated by the off-page connector, processing then proceeds at 802, as depicted in FIG. 8A and in addition, an appropriate error message is generated and sent to the originating side of the call. If the message to be processed is fundamentally sound, a decision is made at 856 to ascertain that the message is acceptable in the state of current processing. If the message is not correct for the current processing state, it is rejected and at 850 an error message is constructed that indicates that the message received is an improper message for the current state. This message is then sent to the originating side of the call. In addition, as directed by the off-page connector, control is returned to 802 and processing continues as depicted in FIG. 8A.

If the message is determined to be correct for the current state, processing then proceeds by determining if the information elements (or data contained within the message) are correct. Each information element contained in the message is inspected in turn at 857 and as processing proceeds, a determination is made at 858, through program logic that determines whether or not a given information element is understandable. If an information element is determined to be in error, processing proceeds at 860. The individual information element is rejected, an error message constructed that indicates that the information element received is not understandable and the message is sent to the originating side of the call. Processing then proceeds at 857, inspecting the next information element in turn.

If the Information Element is determined to be correct, processing proceeds to 862 where a given Information Element is written into Call Context 416. Processing continues as described at steps 858 through 864 until all information elements are processed in turn and written to Call Context 416. When no more information elements are found in the current message, a determination is then made at 866 as to whether or not additional messages are waiting to be processed. If additional messages are waiting to be processed, control is returned to step 802, described in conjunction with FIG. 8A, to handle the next message.

If no more messages are waiting to be processed, processing continues to the interworking phase at 868. The inter-working phase is comprised of processing and/or manipulation of information elements from the Call Context 416 through the use of program logic that implements the rules that are derived from the knowledge contained in the Protocol Definition data store 704 and the UCM Definition data store 706. Inter-working may be as simple as the copying of one or a plurality of Information Elements from one part of the Call Context 416 structure to another part, or as complicated as performing manipulation of the data according to pre-defined algorithms or formulae. Two illustrative examples of the interworking phase and the resultant content of selected elements of the Call Context 416 are presented in FIGS. 9B and 9C and are more fully described in the accompanying text. As each inter-working rule us applied, a determination is made at 870 as to whether or not all required inter-working is complete. If it is not complete, the next inter-working rule is applied beginning from 868. It should be noted that any requirement for data manipulation by or obtaining additional information from External Systems 530 would be identified, scheduled and performed during the inter-working phase.

When inter-working is complete, processing continues with elements being read at 872 from Call Context 416. Processing continues as elements required for the outbound message are read in turn and the outbound message is iteratively constructed. As each item is read from Call Context 416, a determination is made at 874 as to whether or not reading necessary data elements from Call Context 416 is complete. If reading is not complete, reading continues at 872. If reading is complete, the outgoing message is encoded at 876 through program logic that reads in the terminating side protocol definition 704 and cooperating with other internal program logic encodes the message from the intelligible internal format to the outgoing protocol-specific raw bit string. An outgoing protocol message is then delivered at 878.

With reference now to FIG. 9A, the Information Elements elements typically contained in the Call Context 416 of a given call instance 402 are illustrated. It should be noted that these "typical" Information Elements represent a sub-set of the hundreds of Information Elements that are necessary in describing all possible protocols in the UCM 414. Call Context 416*a* lists the storage areas of the data elements, and Call Context 416*b*, 416*c*, 416*d*, and 416*e* illustrate four different call instances, thereby showing the real world situation where Protocol Conversion Engine 400 can handle a number of calls at the same time, each call having one and only one Call Instance 402. The data stored in each Call Context 416*a* for each Call Instance 402 typically includes at least the following Information Elements:

- Terminating Bearer Channel Service State 900, indicates the service state of the terminating side bearer channel. This element is used to determine whether or not the bearer channel that is expected to be utilized on the terminating side of the call is available and to ensure that it is not out of service.
- Terminating Bearer Channel Identifier 902, is represented as the unique circuit identifier of the terminating side bearer channel.
- Originating User/Network Flag 904 indicates whether the originating side of a given call is designated as being either User or Network side. In other words, this allows the determination of whether or not the originating side of the call is communicating with customer premises equipment (user side) or with the network side. A flag in the context of the definitions provided herein is a single character that is used to permit the program logic to make decisions based on a binary choice (e.g. on/off, yes/no, etc.).
- Terminating User/Network Flag 906 indicates whether the terminating side of a given call is designated as being either User or Network side. In other words, this allows the determination of whether or not the terminating side of the call is communicating with customer premises equipment (user side) or with the network side.
- Originating Call Reference 908 indicates the originating side call reference identifier. This element facilitates the unique identification of the originating side of a given call, unique to all others, within the context of a given UPC, as well as to a particular call instance.
- Terminating Call Reference 910 similarly indicates the terminating side call reference identifier. This element facilitates the unique identification of the terminating side of a given call, unique to all others, within the context of a given UPC, as well as to a particular call instance.
- Originating Signaling Channel Identifier 912, allows for the unique identification of the originating side signaling or control channel.
- Terminating Signaling Channel Identifier 914, allows for the unique identification of the terminating side signaling or control channel.
- Originating Overlap/En-bloc Flag 916 indicates whether the originating side of a given call is capable of sending either a single digit at a time or partial digit string versus a complete string of digits.
- Terminating Overlap/En-bloc Flag 918 indicates whether the terminating side of a given call is capable of receiving a single digit at a time or partial digit string versus a complete string of digits.
- Originating Min Message Length 920 indicates the minimum message length, in terms of the dialed digits, on the originating side of a given call. In other words, what is the minimum number of digits dialed for a valid call.
- Originating Max Message Length 922 indicates the maximum message length, in terms of dialed digits, on the originating side of a given call. Upon determining that the maximum number of dialed digits has been entered, a sending complete message is automatically sent.
- Actual Originating Party ID 924 is the line identification of the originator of a call. As is more specifically described with respect to CLI 948, this may not be the number presented to the Terminating Party.
- Calling Line ID Validation Feature Flag 926 indicates whether or not the calling line identification (CLI) validation feature is enabled for a given call.
- Number Translation Feature Flag 928 indicates whether or not the number translation feature is enabled for a given call.
- Tone Detection Feature Flag 930 indicates whether or not the tone detection feature is enabled for a given call.
- Originating Signal Subscription 932 is a boolean array, indexed by a unique signal identifier, representing the possible set of available signals to which the originating side of the call subscribes. This is particularly useful in responding to or handling signals supported by one side of the call and not the other.
- Terminating Signal Subscription 934 is a boolean array, indexed by a unique signal identifier, representing the possible set of available signals to which the terminating side of the call subscribes. This is particularly useful in responding to or handling signals supported by one side of the call and not the other.
- Originating Protocol Type 936 indicates the particular protocol employed on the originating side of a given call.
- Originating Protocol Group 938 indicates the protocol group or family to which a specific protocol, on the originating side of a given call, belongs.
- Terminating Protocol Type 940 indicates the particular protocol employed on the terminating side of a given call.
- Terminating Protocol Group 942 indicates the protocol group or family to which a specific protocol, on the terminating side of a given call, belongs.
- Local Mode 944 indicates whether or not a given call involves manipulating data on each side of the call (i.e. in the case of dissimilar protocols) to populate or read call context data.
- Buffer Mode 946 indicates whether or not a given call involves using the "pass through" mode on each side of the call (i.e. in the case of the same or similar protocols) to populate or read call context data.
- Calling Line Identification ("CLI") 948 is the specific number identity to be presented to the terminating party in a call. For example, for purposes of privacy, the CLI presented to the Terminating Party (presumed to be equipped with a Caller ID type service) of a call originated by an executive from within a PBX may be that of the main number for the PBX and not the specific number of the executive's line.
- Buffer 950 is defined as a series of elements involved in a conversion that represent the elements to be copied to the output or terminating side, when buffer mode is enabled. This is not used when local mode is enabled.

Sending Complete Flag 952 is a boolean flag used to indicate whether or not sending, of the string of dialed digits, is complete.

Dialed Destination Number 954, sometimes called dialed address number, contains the dialed string of digits if operating in en-bloc mode or the collection of component parts if operating in overlap mode.

Translated Destination Number 956 number is sometimes called translated dialed address number. If Number Translation is enabled and if operating in en-bloc mode, this Information Element contains a copy of the Dialed Destination Number 954; or, if operating in overlap mode, the current Dialed Destination Number 954 part.

Bearer Capabilities 958 is used to define the specific use capability of the bearer channel among one or a plurality of choices including services (e.g Voice, FAX, Asynchronous Data, Synchronous Data) and communications rates (e.g. 2400 Baud, 4800 Baud, 9600 Baud, etc.).

Other data could be stored in Call Context 416 depending upon the needs and configuration of the protocols of the connecting networks.

Figure 9B:
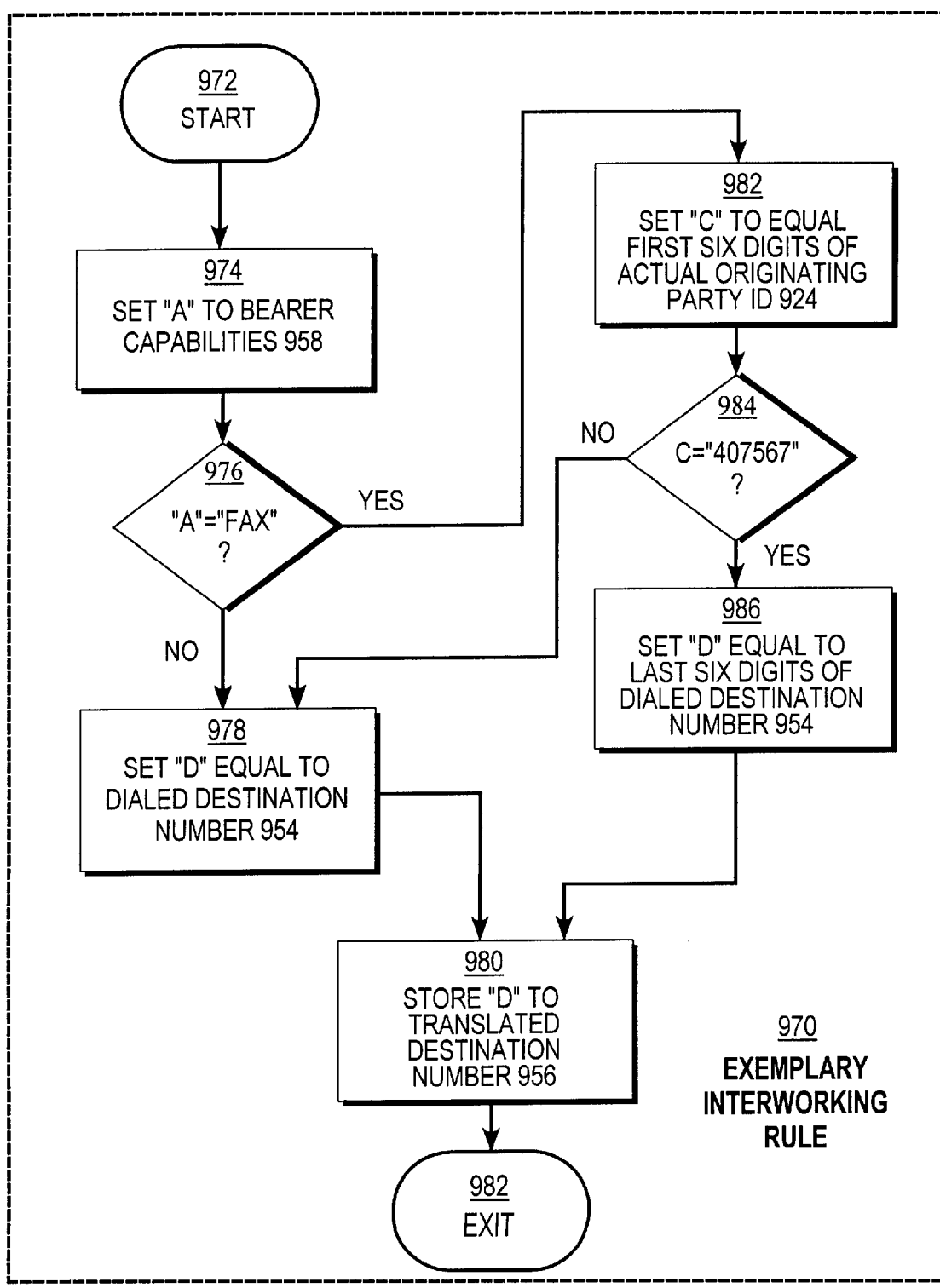
FIG. 9B depicts a flow chart of an exemplary inter-working rule, and the effect of such rule on the contents of select Information Elements with the Call Context record.

Referring now to FIG. 9B there is depicted an exemplary Inter-Working Rule 970 that demonstrates the conditional manipulation of Dialed Destination Number 954. Starting at 972 the process begins with the initialization at 974 of memory variable "A" as being equal to the Bearer Capabilities 958. A conditional test at 976 is used to determine which of two process branches is followed. In the case of a "positive" test of condition 976, processing continues with 982 where memory variable "C" is initialized to equal the first six digits of the Actual Originating Party ID 924. Thereafter another conditional test occurs at 984 to determine which of two processing branches is followed. In the case of a "negative" test at 984 processing continues at 978 which is also the resulting branch for a "negative" test at 976. At 978 memory variable is initialized to equal the Dialed Destination Number 954. In the case of a "positive" test at 984 processing continues at 986 with the intialization of memory variable "D" to equal the last six digits of the Dialed Destination Number 954. All processing branches converge at 980 where the contents of memory variable "D" are stored as the Translated Destination Number 956.

Referring now to FIG. 9C there are depicted examples of the contents of selected Information Elements of the Call Context 416. The Call Context 416 Information Elements shown in 990a and 990b depict the content of the selected Information Elements before and after, respectively, the processing of Inter-Working Rule 970. In this first example, the processing follows the path from the conditional test at 976 to 982, and at the conditional test at 984 to 986, ultimately resulting in the population of the Translated Destination Number 956 with a manipulation of the Dialed Destination Number 954. This example is illustrative of dialed digit manipulation as may be required because the terminating network element only requires a sub-set of the actual dialed number, and therefore the leading digits that are not required are deleted.

Referring now to FIG. 9D, 992a and 992b depict the content of the selected Information Elements before and after, respectively, the processing of the Inter-Working Rule 970; however, because of the difference between the contents of the Actual Originating Party ID 924 in 990a and 992a, the processing path is different. The contents of 924 in 992a result in a positive test at 976 and a negative test at 984, thus processing ends with 978, 980, and 982.

FIGS. 10 through 22 have been prepared in general conformance with the ITU Recommendation Z.120 establishing the Specification and Description Language ("SDL"). These figures depict state diagrams for the UCM 414 in which states are depicted as "rounded-rectangles", the allowable input signals as rectangles having an "angular indentation", and the allowable output signals as rectangles having a "pointed side". When the angular indentation of an input signal in the illustrations is on the left side of the indented rectangle, it refers to a signal coming from the Originating side of the call, thus denoting input into UCM 414 from OCC 410. When the pointed side of an output signal in the illustration points to the left, it refers to a signal destined for the Originating side, thus denoting input into the OCC 410 from the UCM 414. Similarly, when the angular indentation of an input signal in the illustrations is on the right side of the indented rectangle, it refers to a signal coming from the Terminating side of the call, thus denoting input into UCM 414 from TCC 412. When the pointed side of an output signal in the illustration points to the right it refers to a signal destined for the Terminating side, thus denoting input into the TCC 412 from the UCM 414. As the SDL specifications do not include a symbol that it explicitly defined to be used to represent a signal that is from a process environment and that has no directional association (i.e. it is neither associated with originating or terminating side of a call), and as a symbol is required to denote a signal received from the engine environment, a non-conventional symbol—comprised of a rectangle pointing in both directions and containing a rounded rectangle—has been used. This symbol occurs, for example, in FIG. 18 and is labeled as 1822.

Figure 10:
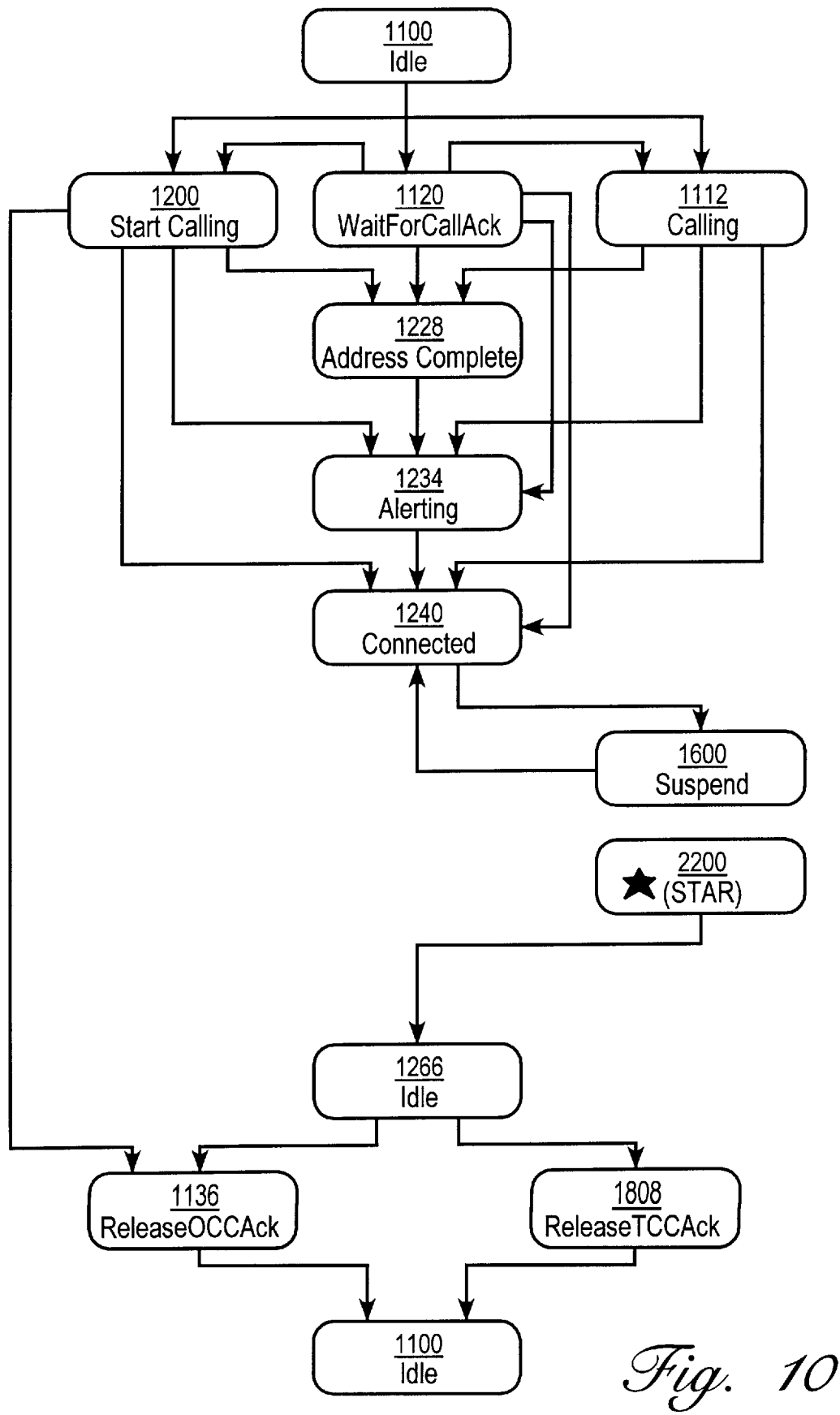
FIG. 10 is a summary state diagram of the state diagrams depicted in FIG. 11 through 22.

In order to better understand the operation of the present invention, it is necessary to understand the various states, as shown in FIG. 10 and with reference to FIG. 3, associated with UCM 414. The states through which UCM 414 moves are relatively independent of the states through which OCC 410 and TCC 412 move, and the states of the latter two are dependent on the protocols of the call they are handling.

Typically, UCM 414 reaches the states shown in FIG. 10 after (1) input signals are received, and/or (2) output signals are sent, by UCM 414 to and from either OCC 410 or TCC 412. OCC 410 is responsible for controlling the protocol data sent from the originating side, and TCC 412 is responsible for handling the protocol data sent from the terminating side.

FIG. 10 represents the hierarchy of the states that UCM 414 can be in, and thus provides a general overview of the state machine. Each of the states depicted in FIG. 10 are described in greater detail in FIGS. 11 through 22 and bear the same number as used in these figures. Thus, FIG. 10 is an overview or summary of the states. For convenience and easier readability, the words "state machine" are sometimes omitted when referring to OCC state machine 410, TCC state machine 412 and UCM state machine 414. One other note of clarification in reference to FIG. 10. All states StartCalling 1200, WaitForCallAck 1120, Calling 1112, Address 1228, Alerting 1234, Connected 1240 Suspend 1600, and Star 2200 ultimately transition to state Releasing 1266 at appropriate times during processing. For purposes of clarity on FIG. 10, the arrows depicting these transitions are omitted, except in the case of the state Star 2200.

Figure 11:
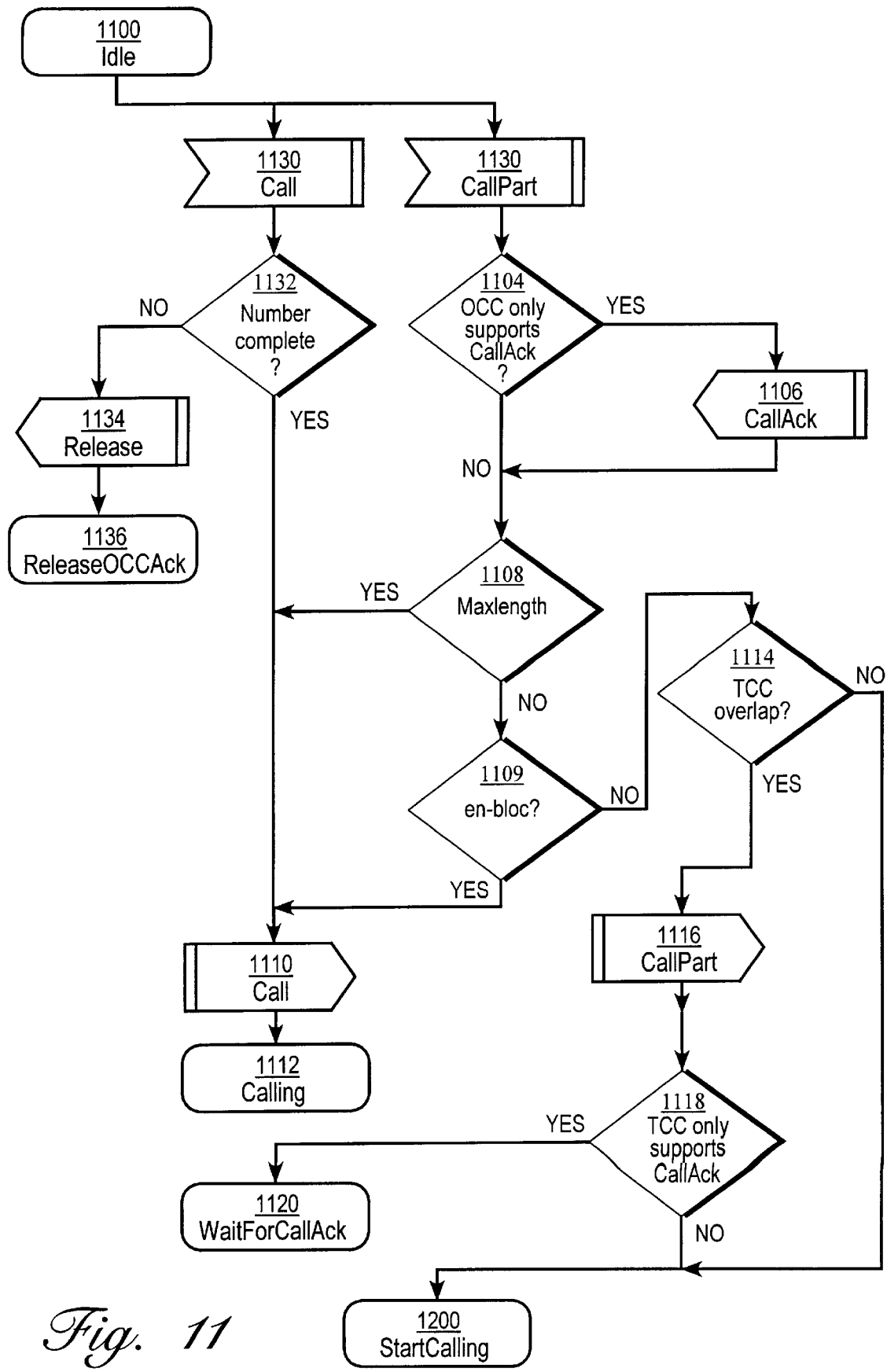
FIG. 11 is a state diagram of the state Idle of the Universal Call Model state machine.

Referring now to FIG. 11, UCM 414 is initially set up when a new Call Instance begins and starts in a state Idle 1100, which is a prerequisite starting point for a call. Typically, there are two types of calls that UCM 414 receives (1) an overlap call in which UCM 414 receives each digit as it is dialed, or (2) an en-bloc call in which UCM 414 receives all digits of the called number at the same time.

According to the overlap call mode, an input signal CallPart 1102 can be received by UCM 414 from OCC 410 that indicates that a part of the called number has been received and that a new call is to be established. Reception of input signal CallPart 1102 may be followed by one or more CallNext signals discussed below (i.e., overlap receiving or sending).

A decision 1104 inquires whether OCC 410 only supports call acknowledgment signal. If OCC 410 only supports call acknowledgment, UCM 414 sends an output signal CallAck 1106 to OCC 410 to indicate that a call set-up is progressing, but further information is required to route the call. This, then, implies that a request for further CallNext 1202 input signals or a CallLast 1218 input signal is to be expected, both being discussed below in conjunction with FIG. 12. If decision 1104 is answered in the negative, or after signal CallAck 1106 has been sent from UCM 414 to OCC 410, UCM 414 enters decision 1108 and inquires whether the maximum length of the called number has been reached. If the answer is no, UCM 414 enters a second decision 1109 and inquires whether the system is in the en-bloc mode. If either decision 1108 or decision 1109 is answered in the affirmative, UCM 414 sends an output signal Call 1110 to TCC 412 that in turn allows UCM 414 to enter a state Calling 1112. Output signal Call 1110 indicates that an initial calling message has been received from the OCC 410, and that a new call is to be established. Reception of signal Call 1110 by TCC 412 implies that all necessary information for the call set up has already been translated into Call Context 416 by OCC 410 and/or UCM 414, and no further calling signals will be received for this call.

State Calling 1112 indicates that signal Call 1110, or a sequence of signal CallPart 1116, CallNext 1202 signals, and CallLast 1218 signal have been received and sent to TCC 412 to set up a new call, and that a response is awaited from TCC 412. A continued discussion of state Calling 1112 is mentioned in conjunction with FIG. 13.

If decision 1109 is answered in the negative, UCM 414 enters decision block 1114 and inquires whether TCC 412 is in the overlap call mode referred to above. If TCC 412 is indeed in the overlap mode, UCM 414 sends an output signal CallPart 1116 to TCC 412 that allows UCM 414 to enter a decision block 1118. Output signal CallPart 1116 is similar to input signal CallPart 1102 in that both indicate that an initial calling message has been received from the OCC 410 and that a new call is to be established. Reception of signal CallPart 1116 may be followed by one or more CallNext 1202 signals discussed below. Reception of signal CallPart 1116 indicates that only some of the necessary information to set up the call has already been translated into Call Context 410 by OCC 410 or UCM 414.

Decision 1118 inquires whether TCC 412 only supports call acknowledgment. If decision 1118 is answered in the affirmative, UCM 414 enters a state WaitForCallAck 1120 in order to wait for a call acknowledgment from TCC 412. State Calling 1112 is discussed in further detail below in conjunction with FIG. 13.

If either decision 1118 or decision 1114 is answered in the negative, UCM 414 enters a state StartCalling 1200. State StartCalling 1200 indicates that input signal CallPart 1102 has been received from OCC 410 by UCM 414. State StartCalling 1200 is continued below in conjunction with FIG. 12.

Alternatively, in the en-bloc call mode mentioned above, an input signal Call 1130 is received from OCC 410 which indicates that an initial calling message has been received from the OCC 410 and that a call is to be established. Reception of this signal implies that all necessary information for the call setup has already been translated into the Call Context 416. UCM 414 enters a decision 1132 and inquires whether the called number is complete.

If the output from decision 1132 is answered in the negative, UCM 414 sends output signal Release 1134 to OCC 410 and then enters state ReleaseOCCAck 1136. In FIG. 11, after a Release 1134 signal has been sent, the particular state machine moves to a state ReleaseOCCAck 1136 indicating that a Release 1134 signal has been sent to OCC 410, and that the UCM 414 is awaiting acknowledgment from OCC 410 with a ReleaseAck 1806 signal after TCC 412 has already acknowledged with a ReleaseAck 1810 signal while in a releasing state.

Release 1134 or 1264 signals are used to indicate that a release request message has been received from either the OCC 410 or the TCC 412. Reception of a Release 1134 or 1264 signals implies that the call release has begun in either OCC 410 or TCC 412 because the sending of the Release signal is used to start releasing in that side of the call. A ReleaseAck 1806 or 1810 signal can be expected in response from the side receiving the Release 1134 or 1264 signals.

However, if decision 1132 is answered in the affirmative, UCM 414 sends output signal Call 1110 to TCC 412 and transitions to state StartCalling 1200 as mentioned above.

Figure 12:
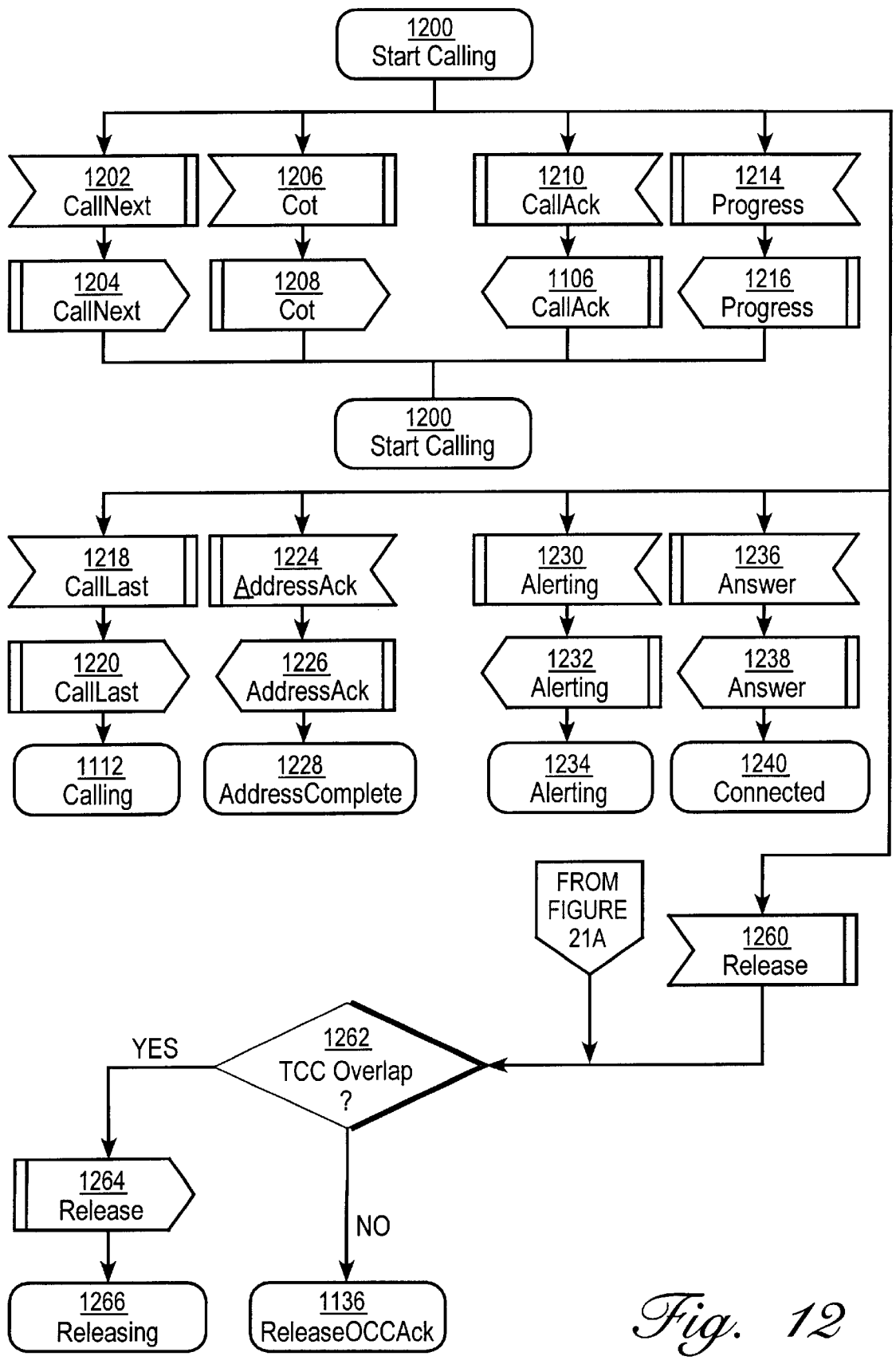
FIG. 12 is a state diagram of the state StartCalling shown in FIG. 11.

FIG. 12 depicts the transitions from state StartCalling 1200, the particular transition being dependent upon the particular signal received and whether it was received from OCC 410 or TCC 412.

Upon receiving an input signal CallNext 1202 from OCC 410, a second signal CallNext 1204 is generated and sent from UCM 414 to TCC 412, causing UCM 414 to remain in the same state.

Continuing with FIG. 12, UCM 414 while in state StartCalling 1200 can also receive an input signal CallAck 1210 sent from TCC 412. UCM 414 then initiates output signal CallAck 1106, discussed above with respect to FIG. 11, to OCC 410. Signals 1210 and 1106 indicate that call set-up is progressing, but further information is required to route the call. Signals 1210 and 1106 also allow UCM 414 to transition to state StartCalling 1200, but also imply a request for a further input signal CallNext 1202 or an input signal CallLast 1218.

Alternatively, when UCM 414 is in state StartCalling 1200, UCM 414 can receive an input signal COT 1206 from OCC 410. Input signal COT 1206 is a general indication of continuity activity. The continuity activity can take the form of either a continuity check result, or a request for a continuity retest. Variables in call context can be examined to determine what action is to be taken. Input signal COT 1206 is generated by OCC 410, transmitted into UCM 414 and then passed on to TCC 412 in the form of an output signal COT 1208, the generation of which allows UCM 414 to transition to state StartCalling 1200.

An input signal Progress 1214 can also be sent from the TCC 412 to UCM 414, the receipt of which initiates an output signal Progress 1216 from UCM 414 to OCC 410 that allows UCM 414 to transition to state StartCalling 1200. Signals 1214 and 1216 indicate that the call set-up is progressing and that sufficient routing information has been received, however, a delay is expected before the next backward signal is received.

An input signal CallLast 1218 is one further possible input signal that can be received by UCM 414. Input signal CallLast 1218 is sent from OCC 410 to UCM 414, whereupon an output signal CallLast 1220 is sent from UCM 414 to TCC 412 in response, both signals indicating that the last of a series of initial calling messages has been received from OCC 410. Signals CallLast 1218 and 1220 imply that all necessary information for the call set-up has already been translated into Call Context 416 by OCC 410 or UCM 414, and no further calling signals will be received for this call. Signals 1218 and 1220 allow UCM 414 to transition to state Calling 1112 discussed below with respect to FIG. 13.

Figure 14:
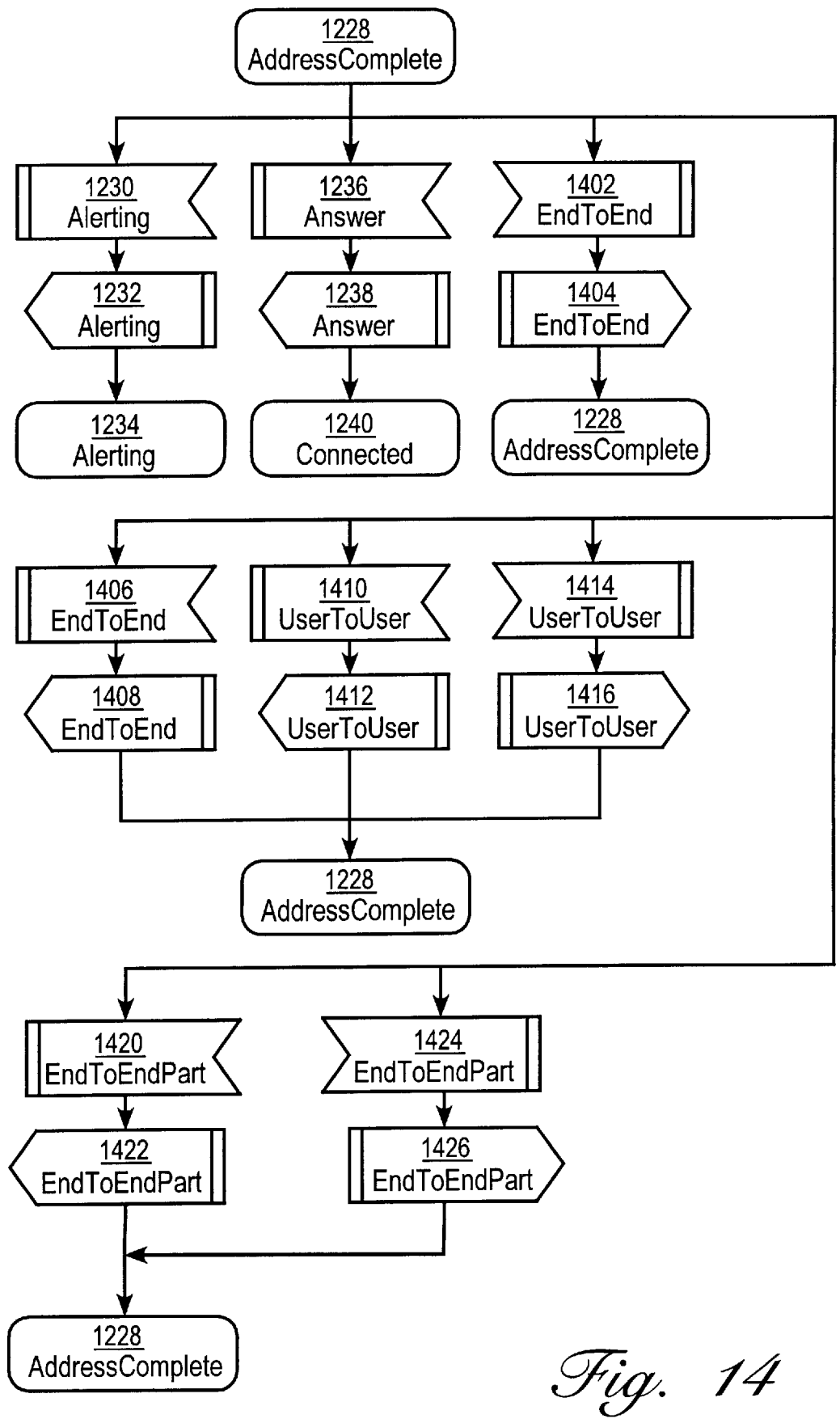
FIG. 14 is a state diagram of the state AddressComplete shown in FIG. 12.
Figure 15:
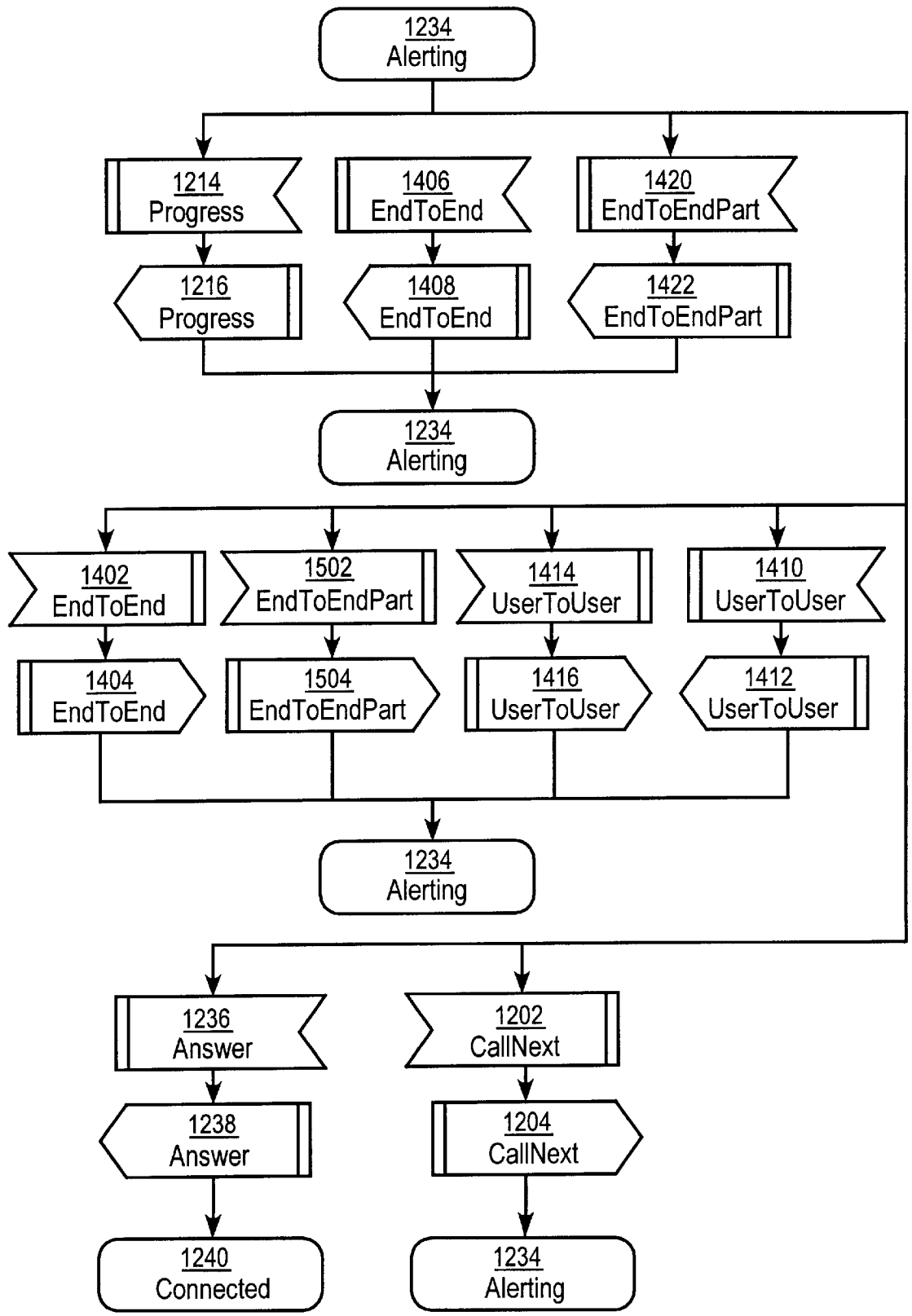
FIG. 15 is a state diagram of the state Alerting shown in FIG. 12.

An input signal AddressAck 1224 is sent from TCC 412 to UCM 414 so that an output signal AddressAck 1226 can be sent from UCM 414 to OCC 410 to indicate that sufficient address digit information has been received to complete call set-up and place UCM 414 in a state AddressComplete 1228, further described in conjunction with FIG. 14. However, signals AddressAck 1226 and 1228 do not imply that the call is set-up to the called user because the call is still routing through the network. In simple calls, the receipt of signal AddressAck 1226 will normally be followed by or replaced by an output signal Alerting 1232. Being in state Address-Complete 1228 simply indicates that input signal AddressAck 1224 has been received from TCC 412 during call set up.

UCM 414, when in the state StartCalling 1200 can also receive an input signal Alerting 1230 from TCC 412, which in turn causes UCM 414 to send an output signal Alerting 1232 to OCC 410 that indicates that sufficient address digit information has been received to complete call set up and that the called user is now being alerted. The receipt and sending of signals Alerting 1230 and 1232 allow UCM 414 to transition to a state Alerting 1234 which simply indicates that input signal Alerting 1230 has been received from TCC 412 during call set up. State Alerting 1234 is discussed in further detail below in conjunction with FIG. 15.

UCM 414 can also receive an input signal Answer 1236 from TCC 412, such that UCM 414 sends a corresponding output signal Answer 1238 to OCC 410 to indicate that an alerted user has now answered, so that the call should be through-connected. The receiving and sending of signals 1236 and 1238 allow UCM 414 to transition to a state Connected 1240, which simply indicates that the input signal Answer 1236 has been received from TCC 412 and that the call is now through connected. State Connected 1240 is discussed in further detail below in conjunction with FIG. 16.

A further alternative for UCM 414 when in state Start-Calling 1200, is the receipt from OCC 410 of an input signal Release 1260 that is used to indicate that a release request message has been received from the OCC 410. Reception of input signal Release 1260 implies that the call release has started in OCC 410. Receipt by UCM 414 of input signal Release 1260 puts UCM 414 into a decision 1262 that inquires whether TCC 412 is in an overlap call mode. If decision 1262 is answered affirmatively, UCM 414 sends an output signal Release 1264 to TCC 412 which is used to start the releasing process in TCC 412.

It is noted that a release acknowledgment signal should be expected to be received by UCM 414 after it receives input signal Release 1260 from OCC 410, or it receives a similar input signal from TCC 412. Similarly, a release acknowledgment signal should be expected after UCM 414 sends output signal Release 1264 to TCC 412 or output signal Release 1134 to OCC 410 as discussed in conjunction with FIG. 11 above.

Output signal Release 1264 allows UCM 414 to transition to a state Releasing 1266 that indicates that some form of release input signal has been received from OCC 410 or TCC 412. Alternatively, it can indicate that an internal release input signal, as discussed in conjunction with FIG. 15 below, has been received from the Protocol Conversion Engine 300 and passed to both OCC 410 and TCC 412 as required. However, it is not known which side, the OCC 410 side or the TCC 412 side, will answer next with a ReleaseAck 1806 or 1810. However, if the output from decision 1262 is negative, then UCM 414 will transition to a state ReleaseOCCAck 1136.

As further shown by FIG. 12, decision 1262 can also be entered by receiving signal Release 1260 generated by OCC 410 when in state WaitForCallAck 1120, as discussed above with respect to FIG. 11 and as further discussed below with respect to FIG. 21.

Figure 13:
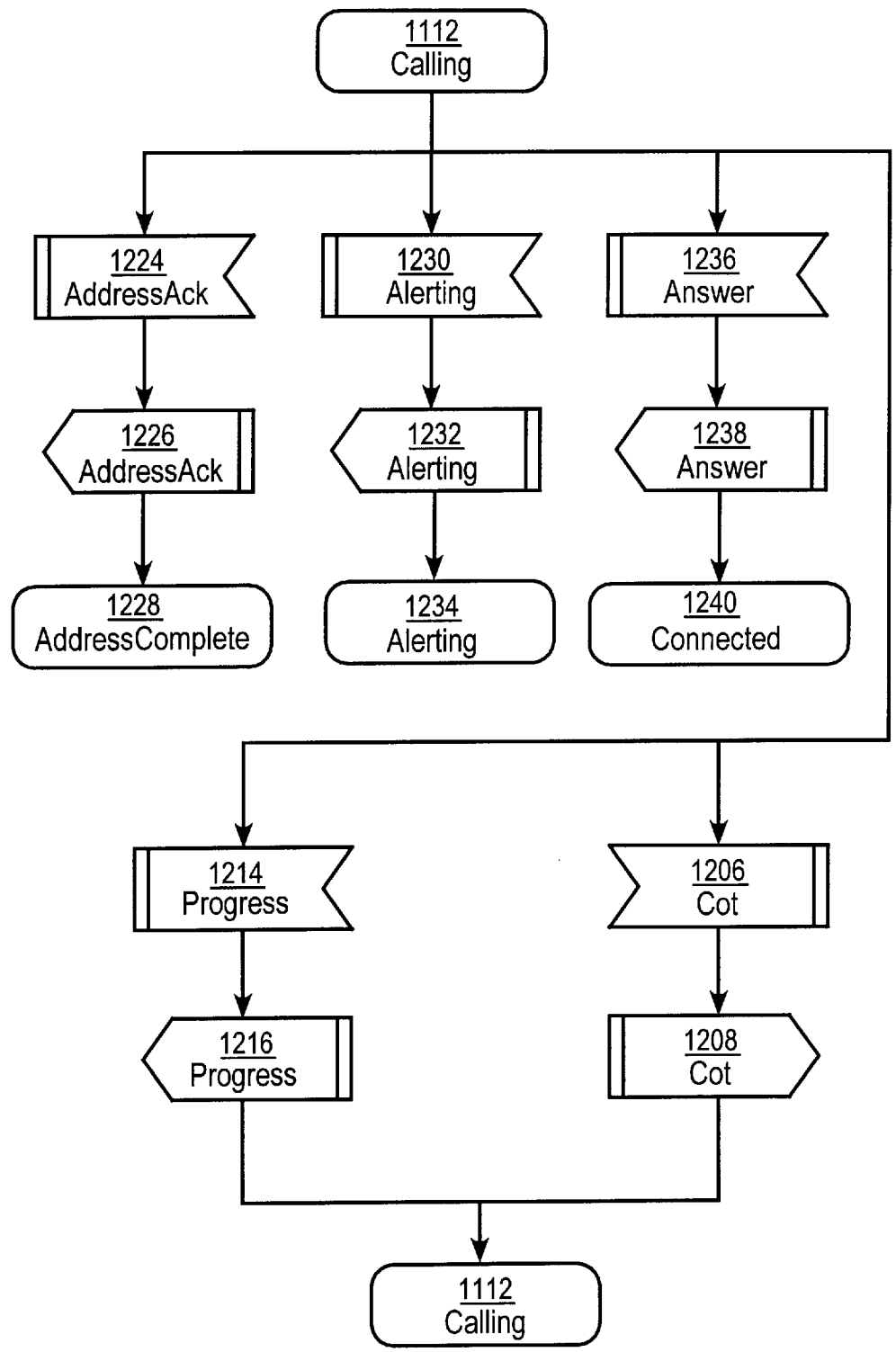
FIG. 13 is a state diagram of the state Calling shown in FIG. 11.

Turning now to FIG. 13, UCM 414 can receive a variety of input signals when it is in the state Calling 1112. Input signal AddressAck 1224, discussed above in conjunction with FIG. 12, is an address acknowledgment signal sent from TCC 412 to UCM 414, which in turn initiates an output signal AddressAck 1226 from UCM 414 to OCC 410. Signal AddressAck 1226 indicates that the call set-up is progressing and that sufficient routing information has been received. However, a delay is expected before the next backward signal is received. Signals 1224 and 1226 allow UCM 414 to transition to state AddressComplete 1228.

UCM 414 transitions from state Calling 1112 to state Alerting 1234 upon receipt by UCM 414 of an input signal Alerting 1230 from TCC 412, and upon the sending by UCM 414 of an output signal Alerting 1232 to OCC 410. Signals Alerting 1230 and 1232 indicate that sufficient address digit information has been received by UCM 414 to complete call setup, and that the user is being alerted. State Alerting 1234 simply indicates the signals alerting 1230 and 1232 have been received and sent, respectively, by UCM 414.

UCM 414 can transition to state Connected 1240 by receiving input signal Answer 1236 and then sending output signal Answer 1238 to OCC 410. Signals Answer 1236 and 1238 indicate that an alerted user has now answered, and that the call should be through connected as discussed above in conjunction with FIGS. 12 and 16.

Alternatively, UCM 414 when in state Calling 1112 can receive input signal Progress 1214 from TCC 412 and then send output signal Progress 1216 to OCC 410 so that UCM 414 transitions to state Calling 1112. Both signals Progress 1214 and 1216, and state Calling 1112 were discussed above in conjunction with FIG. 12.

When in state Calling 1112, UCM 414 can receive input signal Cot 1206 from OCC 410 that initiates UCM 414 to send output signal CallPart 1116 to TCC 412 so that UCM 414 returns to state Calling 1112.

Referring now to FIG. 14, UCM 414 is able to transition from the state AddressComplete 1228, discussed above with respect to FIGS. 12 and 13, to a variety of other states. After UCM 414 receives an input signal Alerting 1230 from TCC 412, and sends a corresponding output signal Alerting 1232 to OCC 410, UCM 414 transitions to state Alerting 1234 that was discussed in conjunction with FIGS. 12, 13 and 15.

The UCM 414 can also transition from state Address-Complete 1228 to state Connected 1240 by receiving input signal Answer 1236, and then sending output signal Answer 1238, as previously discussed in conjunction with FIG. 12 above.

Continuing with FIG. 14, when UCM 414 is in state AddressComplete 1228, an input signal EndToEnd 1402 can be sent from OCC 410 to UCM 414 which initiates UCM 414 to send an output signal EndToEnd 1404 to TCC 412. Input and output signals EndToEnd 1402 and 1404 are used to transparently transport information from OCC 410 to TCC 412 between the local access nodes. The receipt of input signal EndToEnd 1402 and the sending of output signal EndToEnd 1404, allow UCM 414 to transition to state AddressComplete 1228.

Also when in state AddressComplete 1228, UCM 414 can receive an input signal EndToEnd 1406 from TCC 412, which then initiates UCM 414 to send an output signal EndToEnd 1408 to OCC 410. Input signal 1406 and output signal 1408 are similarly used to transparently transport information from side-to-side between the local access nodes and also allow UCM 414 to transition to state AddressComplete 1228 to respond to additional signals.

Additional signals include an input UserToUser 1410 from TCC 412 that allows UCM 414 to initiate an output signal UserToUser 1412 to OCC 410, or an input signal UserToUser 1414 from OCC 410 that allows UCM 414 to initiate and send an output signal UserToUser 1416 to TCC 412. Input signals UserToUser 1410 and 1414, and output signals UserToUser 1412 and 1416 output signals are used to transparently transport information from customer premises equipment to customer premises equipment, and allow UCM 414 to transition to the state Complete 1228.

Other possible input signals include an EndToEndPart signal 1220 from TCC 412 that allows UCM 414 to initiate a corresponding output signal EndToEndPart 1422 to OCC 410 and an input signal EndToEndPart 1424 from OCC 410 that allows UCM 414 to initiate an output signal EndToEndPart 1426 sent to TCC 412. Input signals EndToEndPart 1420 and 1424, and EndToEndPart output signal 1422 and 1426 are used to transparently transport information from side-to-side between the local access nodes, to indicate that further end-to-end information is to be received, and to allow UCM 414 to transition to the AddressComplete state 1228.

FIG. 15 illustrates the possible input and output signals and state transitions from state Alerting 1234, all of which are discussed above in conjunction with FIGS. 12, 13, 14 and 15. Specifically, input signal Answer 1236 and output signal Answer 1238 allow UCM 414 to transition from state Alerting 1234 to state Connected 1240. On receiving of input signal Progress 1214, UCM 414 sends output signal Progress 1216. On receiving input signal EndToEnd 1406, UCM 414 sends output signal EndToEnd 1408. On receiving input signal EndToEnd 1402, UCM 414 sends output signal EndToEnd 1404. On receiving input signal EndToEndPart 1502, UCM 414 sends output signal 1504. On receiving input signal EndToEndPart 1420, UCM 414 sends output signal EndToEndPart 1422. On receiving input signal UserToUser 1414, UCM 414 sends output signal UserToUser 1416. On receiving input signal UserToUser 1410, UCM 414 sends output signal UserToUser 1412. On receiving input signal CallNext 1202, UCM 414 sends output signal CallNext 1204. In all of the aforementioned cases, UCM 414 transitions to state Alerting 1234, effectively not changing state, but merely replicating an input signal and then sending it out in the same direction of flow in which the input signal was received.

Figure 16:
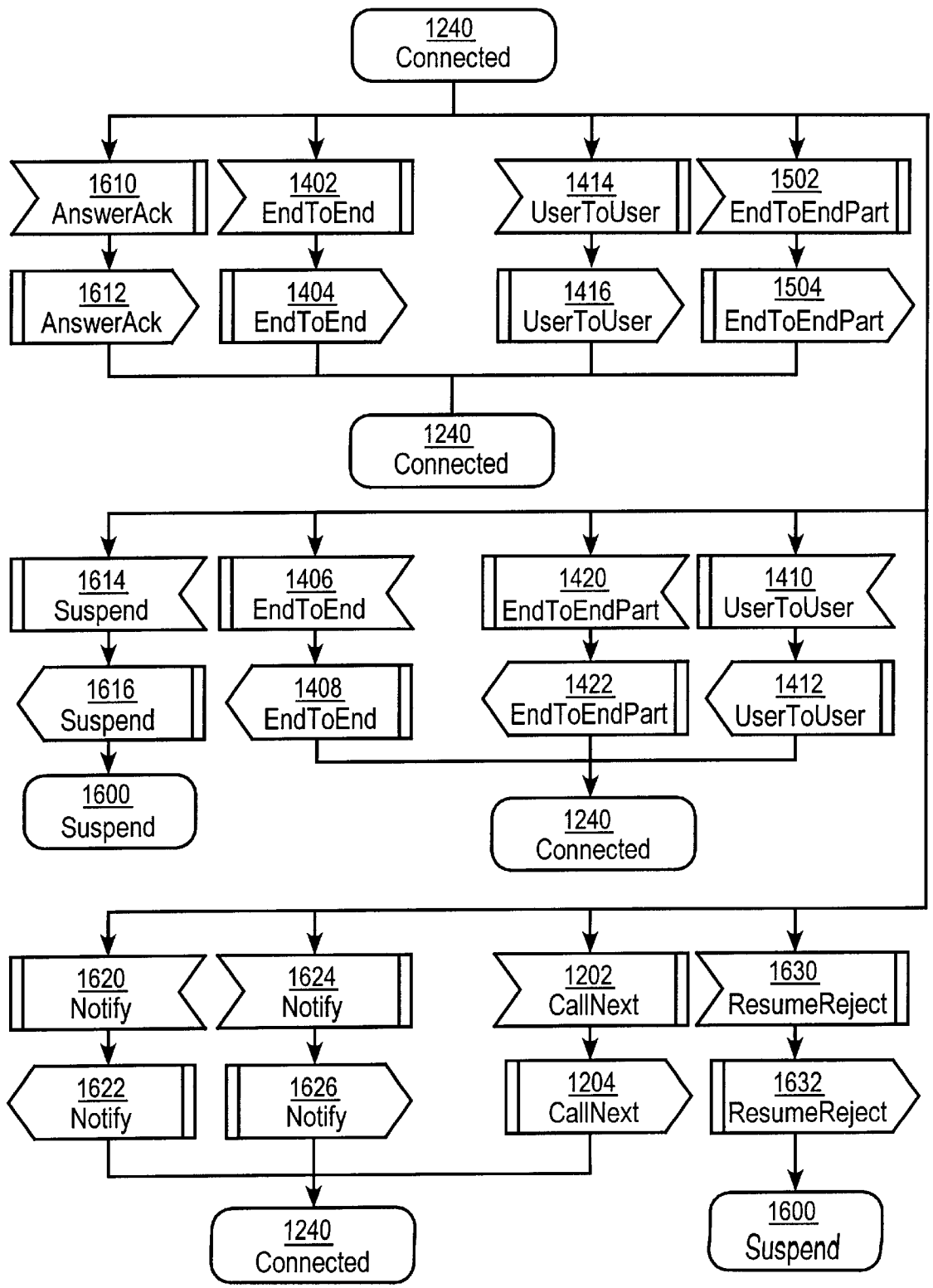
FIG. 16 is a state diagram of the state Connected shown in FIG. 12.

FIG. 16 depicts those signals that are propagated by UCM 414 when it is in state Connected 1240. Specifically, input signals EndToEnd 1402, UserToUser 1414, and EndToEnd 1502, and an input signal AnswerAck 1610, all received from OCC 410, are respectively propagated to TCC 412 by UCM 414 when it is in state Connected 1240 as output signals EndToEnd 1404, UserToUser 1416, and EndToEnd 1504, and an output signal AnswerAck 1612. Signals AnswerAck 1610 and 1612 indicate that a connected calling user has now acknowledged the connection as answered, and the connection should be maintained. In addition, input signals EndToEnd 1406, EndToEndPart 1420, and UserToUser 1410, all received from TCC 412, are respectively propagated to OCC 410 by UCM 414 when it is in state Connected 1240 as output signals EndToEnd 1408, EndToEndPart 1422 and UserToUser 1412. In each case, UCM 414 returns to state Connected 1240 after it propagates the corresponding output signal.

FIG. 16 also depicts the input and output signals that allow UCM 414 to transition between state Connected 1240 and a state Suspend 1600. Upon the receipt by UCM 414 of an input signal Suspend 1614 from TCC 412, UCM 414 initiates an output signal Suspend 1616 to OCC 410, to allow UCM 414 to transition to state Suspend 1600. Signals Suspend 1614 and 1616 indicate the temporary suspension of a call that puts UCM 414 in state Suspend 1600, which is discussed below in conjunction with FIG. 17. Also, upon receipt by UCM 414 of an input signal ResumeReject 1630 from OCC 410, UCM 414 propagates an output signal ResumeReject 1632 to TCC 712 and moves to state Suspend 1600. Signals ResumeReject 1630 and 1632 are used as an acknowledgment of the receipt of a signal Resume, discussed below in conjunction with FIG. 20, where the originating protocol cannot process the Resume request.

An input signal Notify 1620 received by UCM 414 from TCC 412 results in an output signal Notify 1622 being sent by UCM 414 to OCC 410, and an input signal Notify 1624 received by UCM 414 from OCC 410 results in an output signal Notify 1626 being sent by UCM 414 to TCC 412. These signals indicate the status of a suspend request at some distant point, and are passed transparently through UCM 414, but allow UCM 414 to transition to state Connected 1240.

Finally, when UCM 414 is in state Connected 1240, it can also receive input signal CallNext 1202 from OCC 410 and propagate an output signal CallNext 1204 to TCC 412 and then transition to state Connected 1240.

Figure 17:
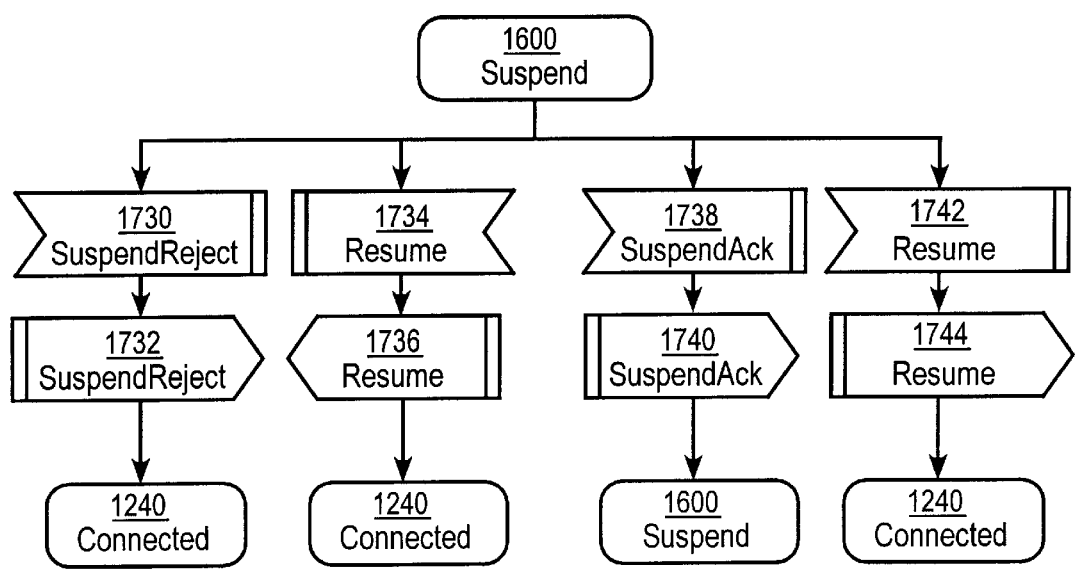
FIG. 17 is a state diagram of the state Suspend shown in FIG. 16.

FIG. 17 illustrates the state transitions associated with state Suspend 1600. When UCM 414 is in state Suspend 1600 and it receives an input signal SuspendReject 1730 from OCC 410, it first generates an output signal SuspendReject 1732 to TCC 412 and then transitions to state Connected 1240, as discussed above. Signals SuspendReject 1730 and 1732 are responses to signals Suspend, such as signals 1614 and 1616, when the line or protocol on the originating call side is unable to process such signals.

UCM 414 can also transition from state Suspend 1600 to state Connected 1240 by receiving an input signal Resume 1734 from TCC 412 or an input signal Resume 1744 from OCC 410 that initiates, respectively, an output signal Resume 1736 or 1744 from UCM 414 to OCC 410 or TCC 412 respectively. Signals Resume 1734 and 1742 after a successful processing of previous suspend signals, such as 1614 and 1616, by the originating protocol, are the next logical signals received and sent, respectively, by UCM 414.

Alternatively, UCM 414 can transition out of state Suspend 1600 upon the receipt from OCC 410 of an input signal SuspendAck 1738 that initiates an output signal SuspendAck 1740 sent by UCM 414 to TCC 412. Signals SuspendAck 1738 and 1740 are responses to the input signal Suspend 1614 originally sent by TCC 412 as discussed above in conjunction with FIG. 16.

UCM 414 can also transition from Suspend state 1600 to Connected state 1240 by receiving from OCC 410 an input signal Resume 1742 that initiates a resume output signal 1744 from UCM 414 to TCC 412. Thus, after previously successfully processing a suspend signal, resume signals 1742 and 1744 are the next logical signals received by UCM 414 so that the call can be continued by transitioning UCM 414 into state Connected 1240.

Figure 18:
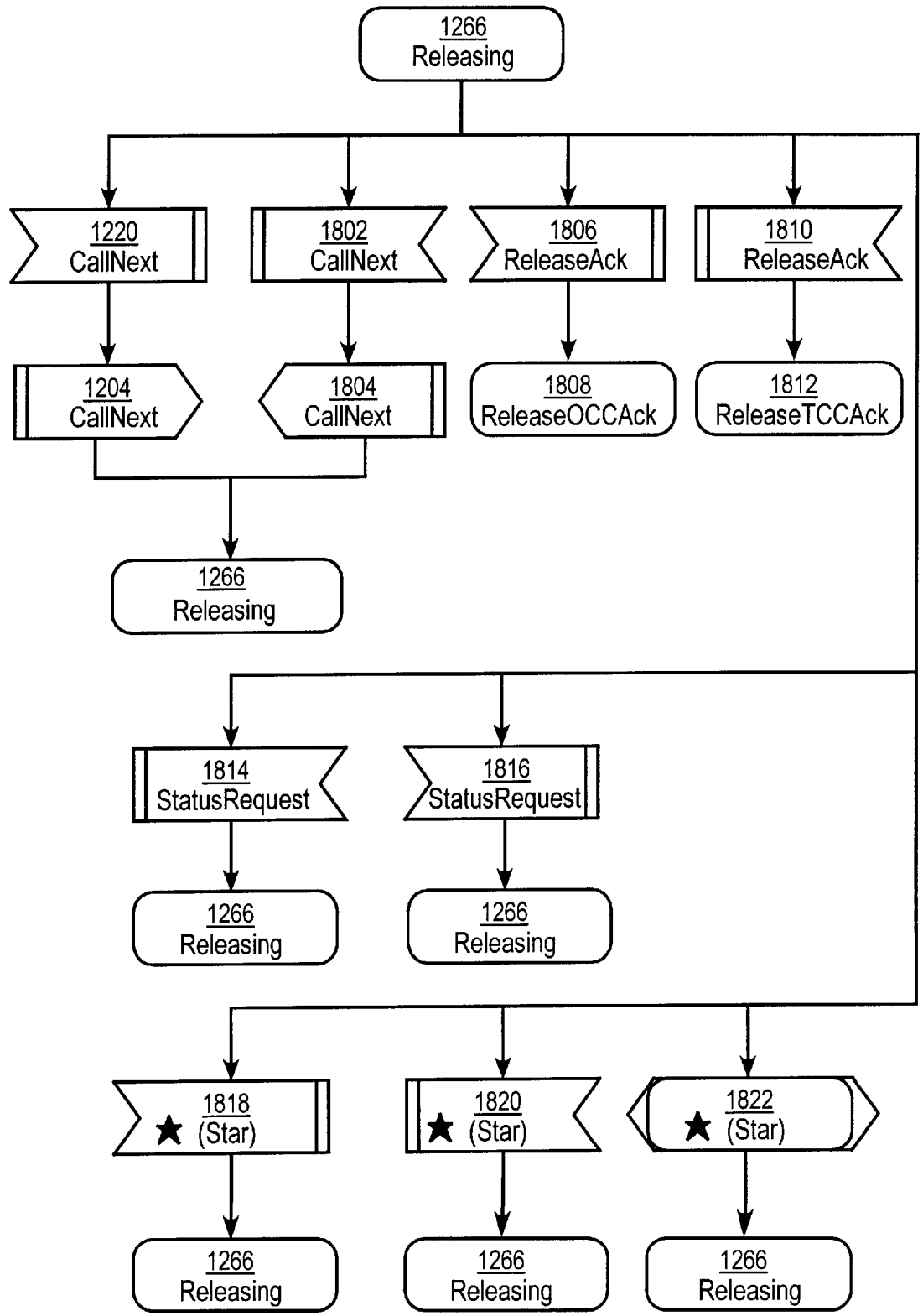
FIG. 18 is a state diagram of the state Releasing shown in FIG. 12.

FIG. 18 illustrates the state transitions of UCM 414 and the signals that it can receive when it is in state Releasing 1266, as previously mentioned in conjunction with FIG. 12. UCM 414 can transition to Releasing state 1266 by receiving input signal CallNext 1220 from OCC 410 that initiates output signal CallNext 1204 sent from UCM 414 to TCC 412. Similarly, UCM 414 can receive an input signal CallNext 1802 from TCC 412 that initiates an output signal CallNext 1804 sent from UCM 414 to OCC 410 to reach state Releasing 1266. Signals CallNext 1802 and 1804 are similar to signals CallNext 1202 and 120, but are from the opposite direction.

Also when UCM 414 is in state Releasing 1266, either an input signal ReleaseAck 1806 from OCC 410 or an input signal ReleaseAck 1810 sent from TCC 412 can cause UCM 414 to move to a state ReleaseOCCAck 1808 or a state ReleaseTCCAck 1812, respectively.

Both input signals ReleaseAck 1806 and 1810 are a confirmation that a previous release signal, such as signals Release 1260 and 1262, has been acted upon, and that releasing of the call is complete such that no other signals can be sent for this call to the side that has sent this signal. Thus, this is the last signal in any sequence.

UCM 414 can also return back to state Releasing 1266 upon the receipt of an input signal Star or Asterisk (*) 1818 from OCC 410, an input signal Star or Asterisk 1820 (*) from TCC 412, or a Protocol Conversion Engine 300 internally generated signal Star or Asterisk (*) 1822. It is noted that any signal Star or Asterisk (*) such as 1818, 1820 and 1822, is not an actual signal but is considered a catch-all signal appended to those states where a signal that is not normally expected as a part of the state, are typically handled. In other words, when UCM 414 is in state Releasing 1266, signals not normally handled by UCM 414 in this state can be sent from OCC 410, TCC 412, or the Protocol Conversion Engine 300. UCM 414 will then transition upon receipt of a "non-allowable" signal to state Releasing 1266.

FIG. 18 also shows that UCM 414 can transition from state Releasing 1266 to the same state upon the receipt of an input signal StatusRequest 1814 from TCC 412, or an input signal StatusRequest 1816 from OCC 410. Signals StatusRequest 1814 and 1816 imply a request for a status signal or a message is to be returned to the same side that sent the signal so that the call state can be returned to OCC 410 or TCC 412.

Figure 19:
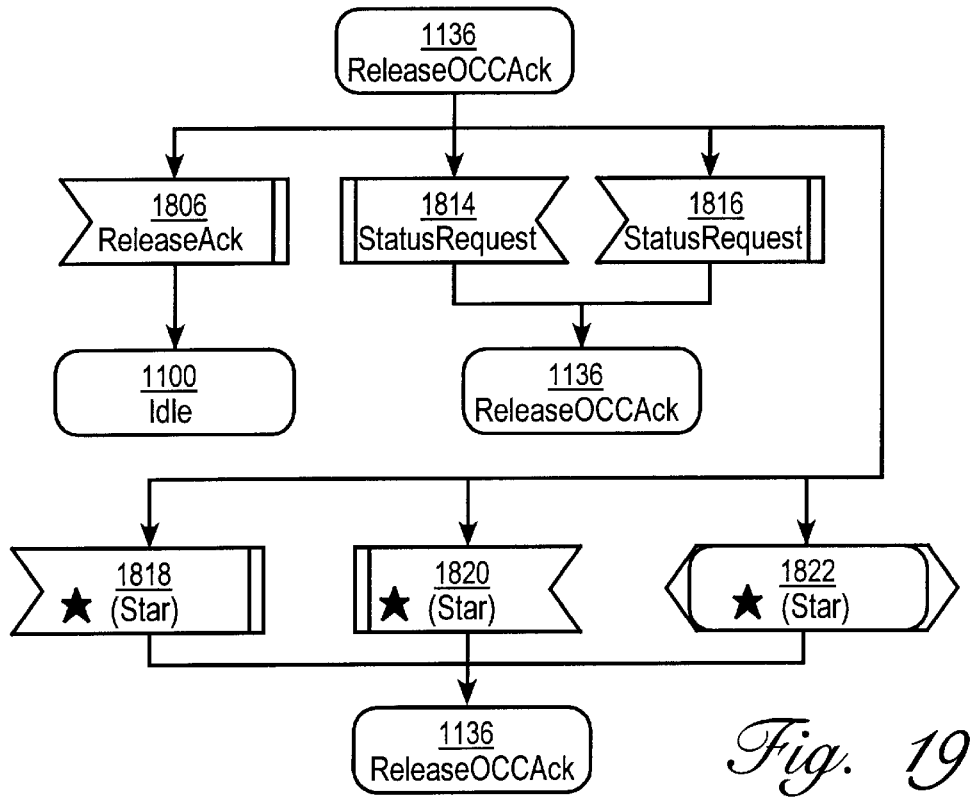
FIG. 19 is a state diagram of the state ReleaseOCCAck shown in FIG. 11.

FIG. 19 illustrates the allowable input signals and corresponding possible state transitions when UCM 414 is in the state ReleaseOCCAck 1136, as previously discussed in conjunction with FIGS. 11 and 12 above. When UCM 414 is in state ReleaseOCCAck 1136 and receives an input signal ReleaseAck 1806 from OCC 410, UCM 414 transitions to state Idle 1100, as described in FIG. 10. In general, signals ReleaseAck 1806 or 1810 can be sent from either OCC 410 or TCC 412 to UCM 414 to confirm that a previous signal Release 1134 or 1264 has been acted upon, and that releasing of the call is complete. Upon completion of releasing of a call, no other signals can be sent for this call to the respective side, either OCC 410 or TCC 412, that has sent the signal. Thus, signals ReleaseAck 1806 or 1810 is the last signal of a call.

Alternatively, UCM 414 can transition from state ReleaseOCCAck 1136 back to the same state upon the receipt of input signal StatusRequest 1814 from TCC 412, or from a signal StatusRequest 1816 from OCC 410. Signals StatusRequest 1814 and 1816 were discussed above in conjunction with FIG. 18.

Also, UCM 414 transitions out of and into state ReleaseOCCAck 1136 upon receipt of input signal Star or Asterisk (*) 1818 from OCC 410, of input signal Star or Asterisk (*) 1820 from TCC 412, or an internally generated signal Start or Asterisk (*) 1822 sent from the Protocol Conversion Engine 300. These signals were discussed above in conjunction with FIG. 18.

Figure 20:
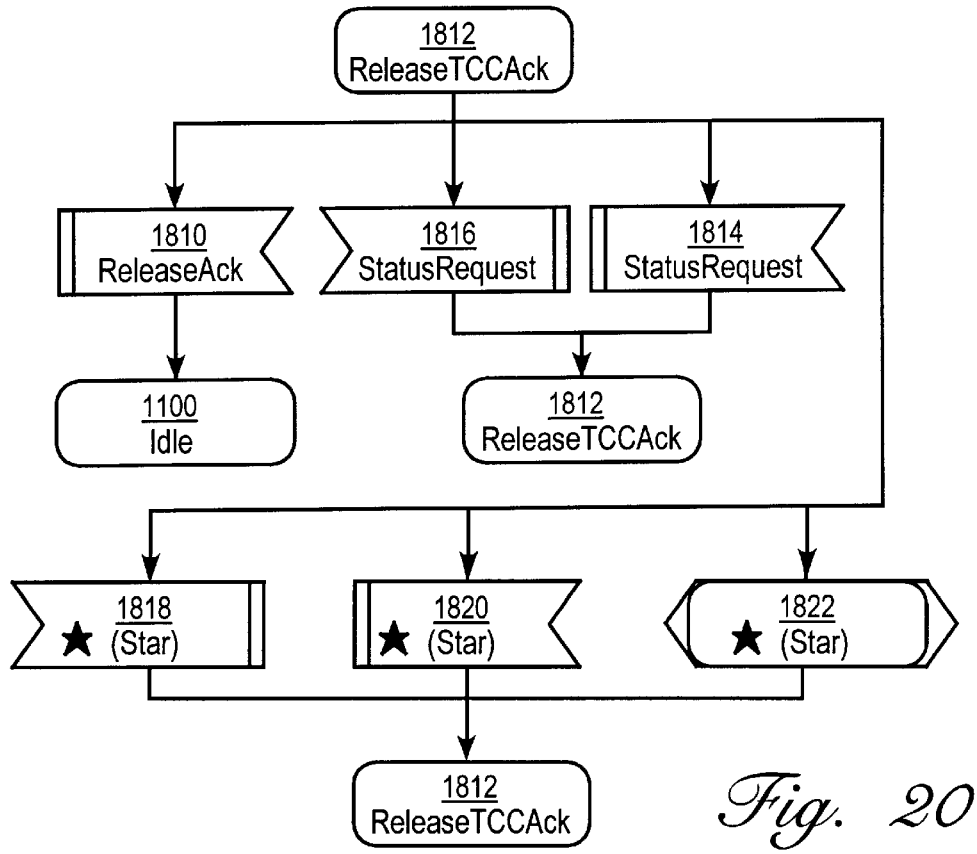
FIG. 20 is a state diagram of the state ReleaseTCCAck shown in FIG. 18.

FIG. 20 illustrates the allowable signals and state transitions of UCM 414 from the state ReleaseTCCAck 1812. The action of UCM 414 in this state are similar to the actions when in state ReleaseOCCAck 1136, except for the direction of the signals. Input signals StatusRequest 1814 and 1816 sent from OCC 410 or from TCC 412 allow UCM 414 to transition to state ReleaseTCCAck 1812. Similarly, either input signal Star or Asterisk (*) 1820 from OCC 410, input signal Star or Asterisk (*) 1818 from TCC 412, or Protocol Conversion Engine 300 internal signal Star or Asterisk (*) 1822 allow UCM 414 to transition to state ReleaseTCCAck 1812 upon receipt of the signals. Upon receipt of input signal ReleaseAck 1810 from TCC 412, UCM 414 transitions to state Idle 1100.

Figure 21A:
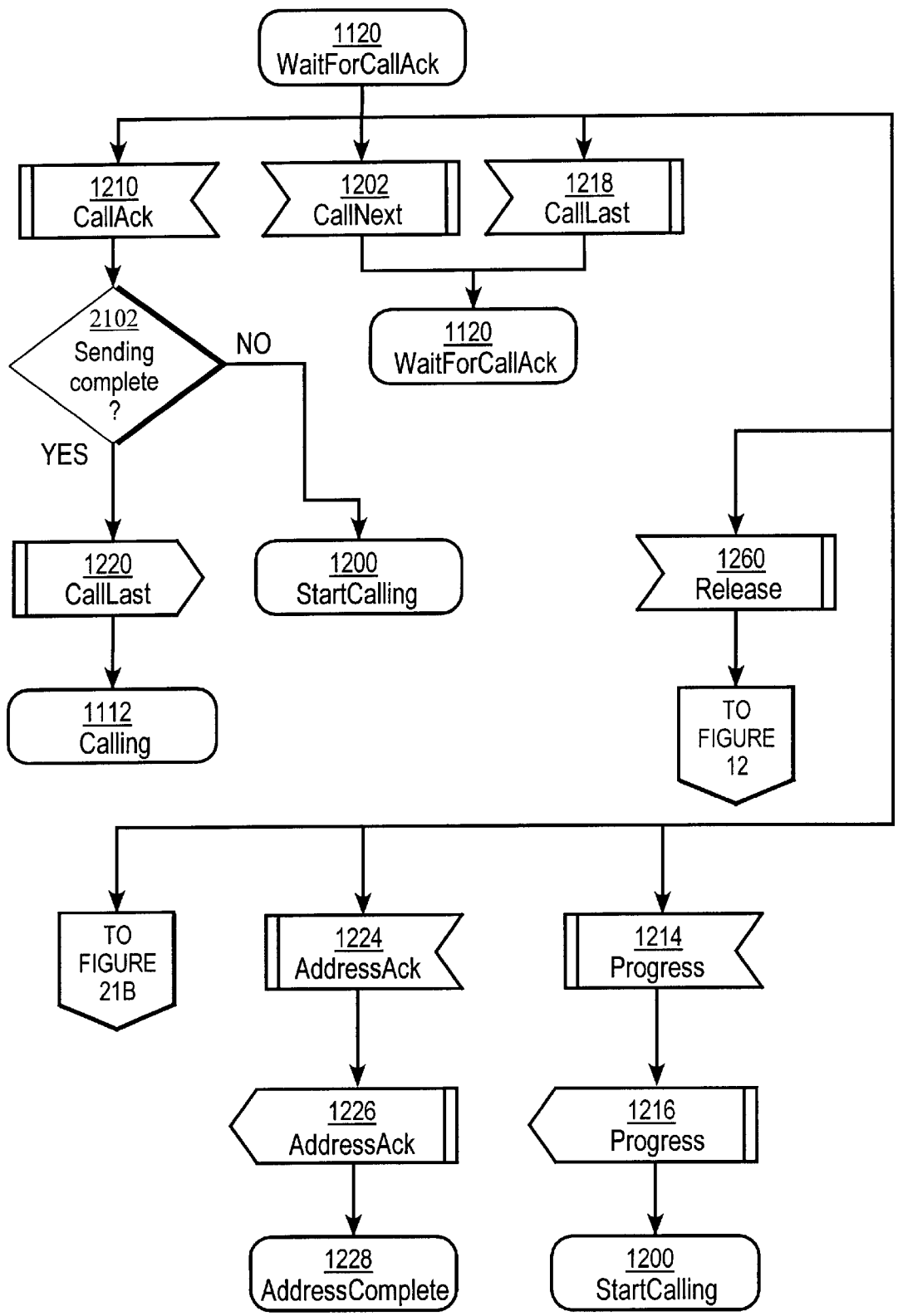
FIGS. 21A and 21B are a state diagram of the state WaitForCallAck shown in FIG. 11.
Figure 21B:
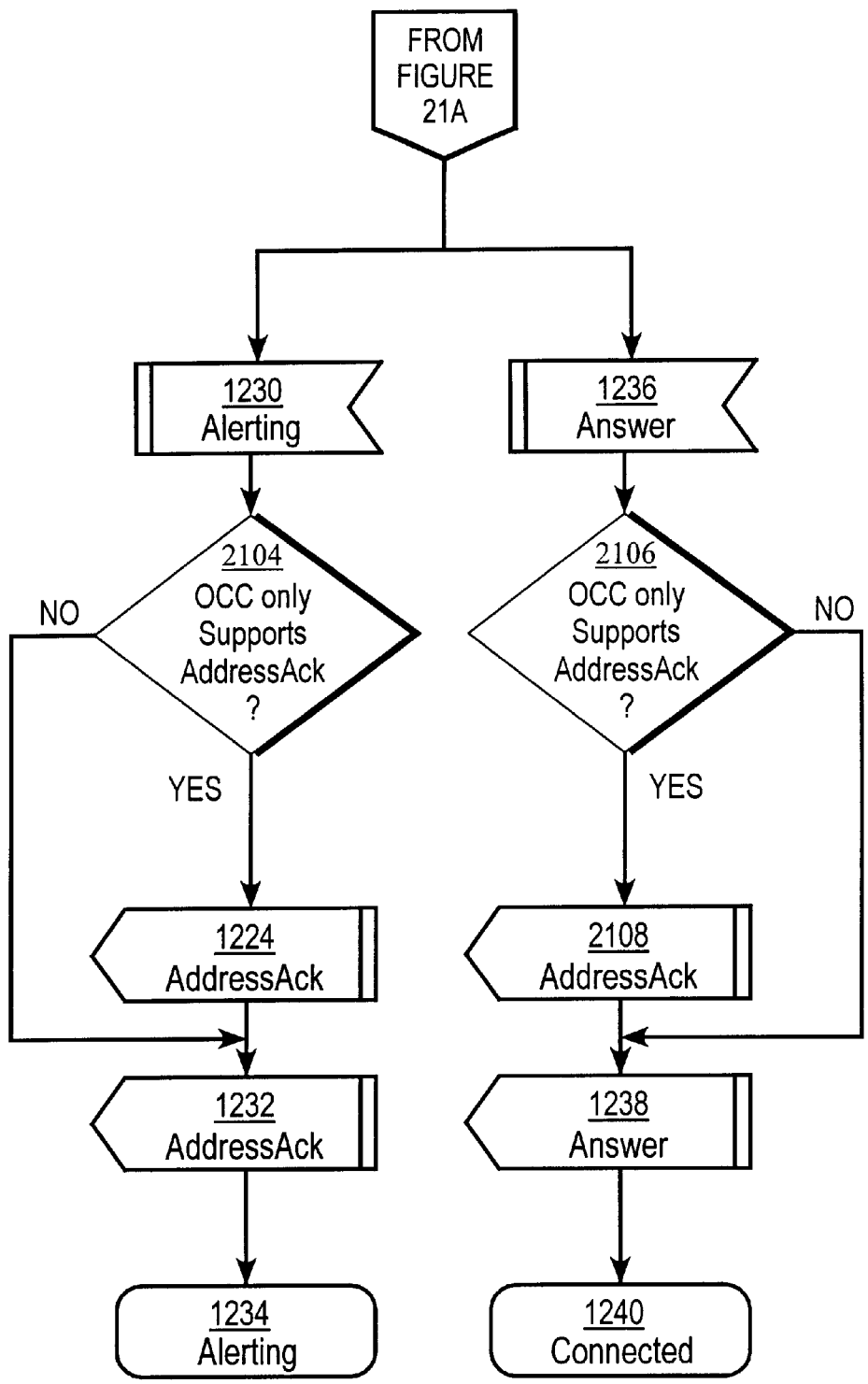

FIGS. 21A and 21B disclose state transitions when UCM 414 is in the state WaitForCallAck 1120 originally mentioned in conjunction with FIG. 11 above. When UCM 414 is in state WaitForCallAck 1120, UCM 414 can receive input signal CallAck 1210 from TCC 412 that moves UCM 414 into a decision 2102. Decision 2102 inquires whether sending of the dialed digits is complete. A negative response to decision 2102 (i.e. sending is not complete) enables UCM 414 to transition to the state StartCalling 1200 discussed above in conjunction with FIG. 12.

An affirmative response to decision 2102 prompts UCM 414 to send output signal CallLast 1220, discussed in conjunction with FIG. 12, to TCC 412 so that UCM 414 can then transition to the state Calling 1112, discussed in conjunction with FIGS. 12 and 13.

UCM 414 can also receive input signals CallNext 1202 and CallLast 1218. Either input signals CallNext 1202 or input signal CallLast 1218 enables UCM 414 to transition to state WaitForCallAck 1120.

If UCM 414 receives input signal Release 1260 from OCC 410 while in state WaitForCallAck 1120, UCM 414 transitions to decision 1262, as depicted in FIG. 21A by an off-page connector to FIG. 12.

UCM 414 can also receive input signal AddressAck 1224 from TCC 412, which results in the initiation of an output signal AddressAck 1226 propagated from UCM 414 to OCC 410 and then a transition to state AddressComplete 1228. Similarly if UCM 414 receives an input signal Progress 1214 from TCC 414, it will propagate a corresponding output signal Progress 1216 and then transition to the state StartCalling 1200.

Upon receiving input signal Alerting 1230 from TCC 412 when UCM 414 is in state WaitForCallAck 1120, UCM 414 moves to a decision 2104. Decision 2104 inquires whether only OCC 410 supports signal AddressAck 1224. A negative response to decision 2104 prompts UCM 414 to send output signal Alerting 1232 to OCC 410 after which UCM 414 transitions to state Alerting 1234, described above in the description of FIG. 12. Alternatively, on an affirmative response in decision 2104, UCM 414 generates output signal AddressAck 1224 to OCC 410, then generates signal Alerting 1232 also to OCC 410 before it transitions to the state Alerting 1234.

Similarly, when UCM 414 receives a signal Answer 1236 from TCC 412 when in state WaitForCallAck 1120, it enters a decision 2106 to determine if only OCC 410 supports signal AnswerAck 2108. If the answer is in the affirmative, UCM 414 generates signal AnswerAck 2108 to OCC 410, and then generates signal Answer 1238 to UCM 414 before moving to state Connected 1240. On the other hand, upon a negative response in decision 2106, which indicates that OCC 410 is not the only side that supports signal Answer-Ack 2108, UCM 414 bypasses the generation of a signal AnswerAck 2108 and only generates output signal Answer 1238 to OCC 410 before it transitions to state Connected 1240.

Figure 22:
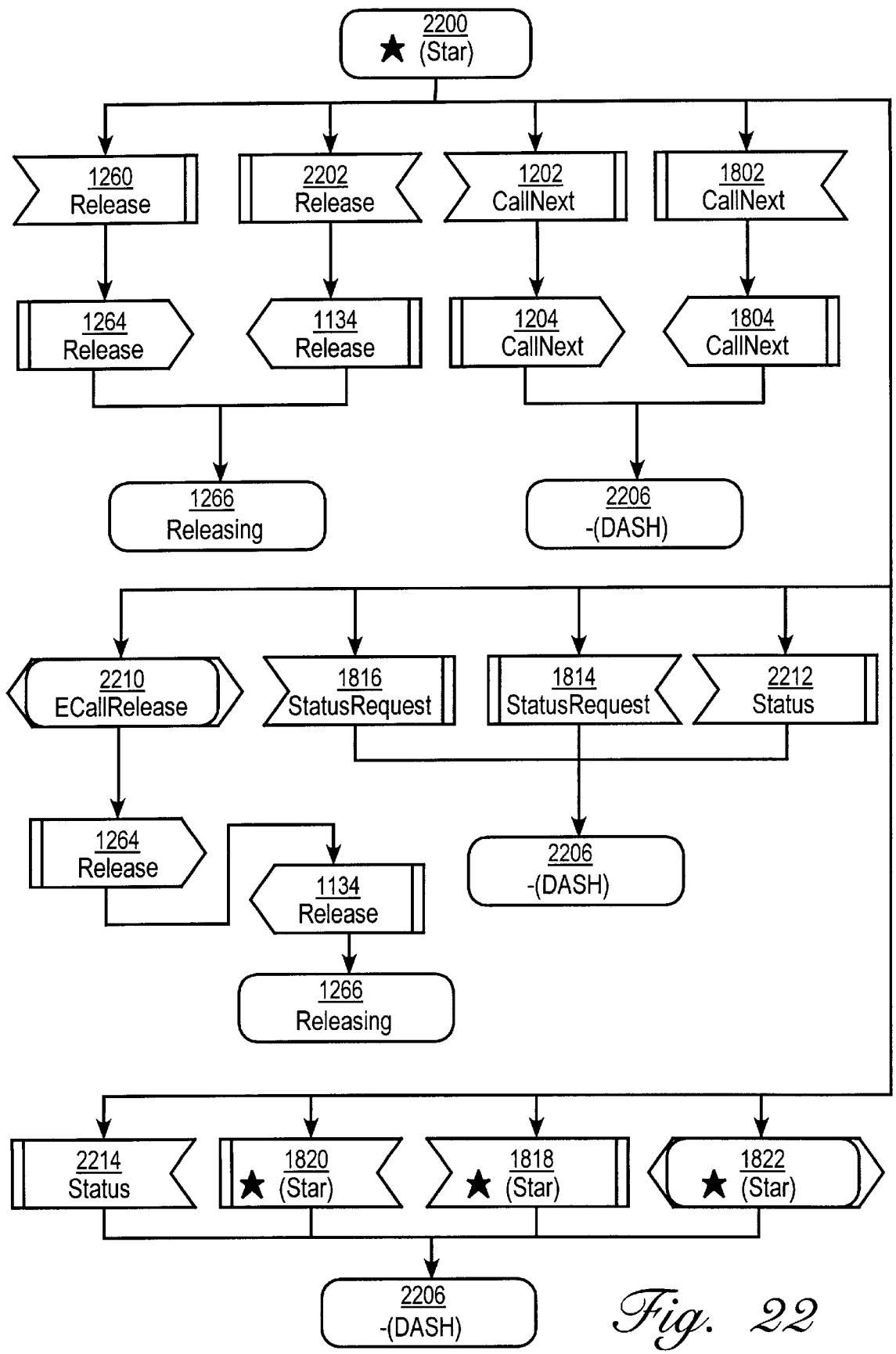
FIG. 22 is a state diagram of the state Star or Asterisk (*) state.

FIG. 22 depicts a state Star or Asterisk 2200, sometimes called state Star or pseudo-state asterisk or star or even state * 2200. The Star or Asterisk state denotes logic that should be executed in all states and is used as a short-hand notation. It is also used in those situations where a particular action or reaction is the same for every state so that it need not be replicated in the diagrams for all states. In FIG. 22, state Star or Asterisk 2200 5 represents a generic handling of signals common to all states. If in some state any nonstandard handling of the same signals is needed, it is defined explicitly in that state. This explicit handling of signals in "real" states overwrites the implicit handling, defined in pseudo-state Star or Asterisk 2200.

Another pseudo-state is state Dash ("-") 2206, which is sometimes referred to as the "dash next state." It is used to mean that the terminating next state is identical to the originating state. Thus, a transition to pseudo-state dash ("-") means that no state change has occurred.

For example, if in any state UCM 414 receives input signals CallNext 1202 or 1802 from OCC 410 or TCC 412, respectively, UCM 414 sends output signals CallNext 1204 and 1804, respectively, and then transitions to state Dash 2206. This is interpreted to mean that UCM 414 remains in the same actual state that it was in before receiving the signal.

On the other hand, when UCM 414 receives input signal Release 1260 from OCC 410 or input signal Release 2202 from TCC 412 while in any state, UCM 414 respectively sends output signal Release 1264 to TCC 412 or output signal Release 1134 to OCC 410, and then transitions to state Releasing 1266.

UCM 414 can also receive a signal ECallRelease 2210 from the Protocol Conversion Engine 300 that initiates output signals Release 1264 and 1134 to TCC 412 and OCC 410, respectively, before moving to state Releasing 1266. Signals from the Protocol Conversion Engine 300 are generated for a variety of reasons, such as at the institution by an operator to shut down the system so that maintenance can be performed.

UCM 414 in any state can receive input signals Status-Request 1814 and 1816 from TCC 412 and OCC 410, respectively, which enables UCM 414 to transition to state Dash 2206. Similarly, an input signal Status 2212 sent from OCC 410, or an input signal Status 2214 sent from TCC 412 can be sent to UCM 414 to enable it to transition to state Dash 2206. Status signals 2212 and 2214 can be sent from and received by both OCC 410 and TCC 412 via UCM 414 to answer with status information from OCC 410 or TCC 412.

Lastly, FIG. 22 shows the use of an input signal Star or Asterisk (*) 1818 from OCC 410 or input signal Star or Asterisk (*) 1820 from TCC 412 being sent to UCM 414 and then a transition by UCM 414 to the state Dash 2206. A signal Star or Asterisk (*) in SDL notation is used to represent all other signals for which no transition is specified elsewhere. The use of state Star or Asterisk 2200 in combination with an Asterisk signal and a transition to a Dash 2206 state is universal notation that is used to show that sometimes a signal will be ignored by UCM 414. This notation is sometimes omitted because it is understood to exist in all state machines. In the context of FIG. 22, it means that in all states, the reception of an undefined signal will cause a state transition to the same state, or effectively, no transition will occur.

Figure 23:
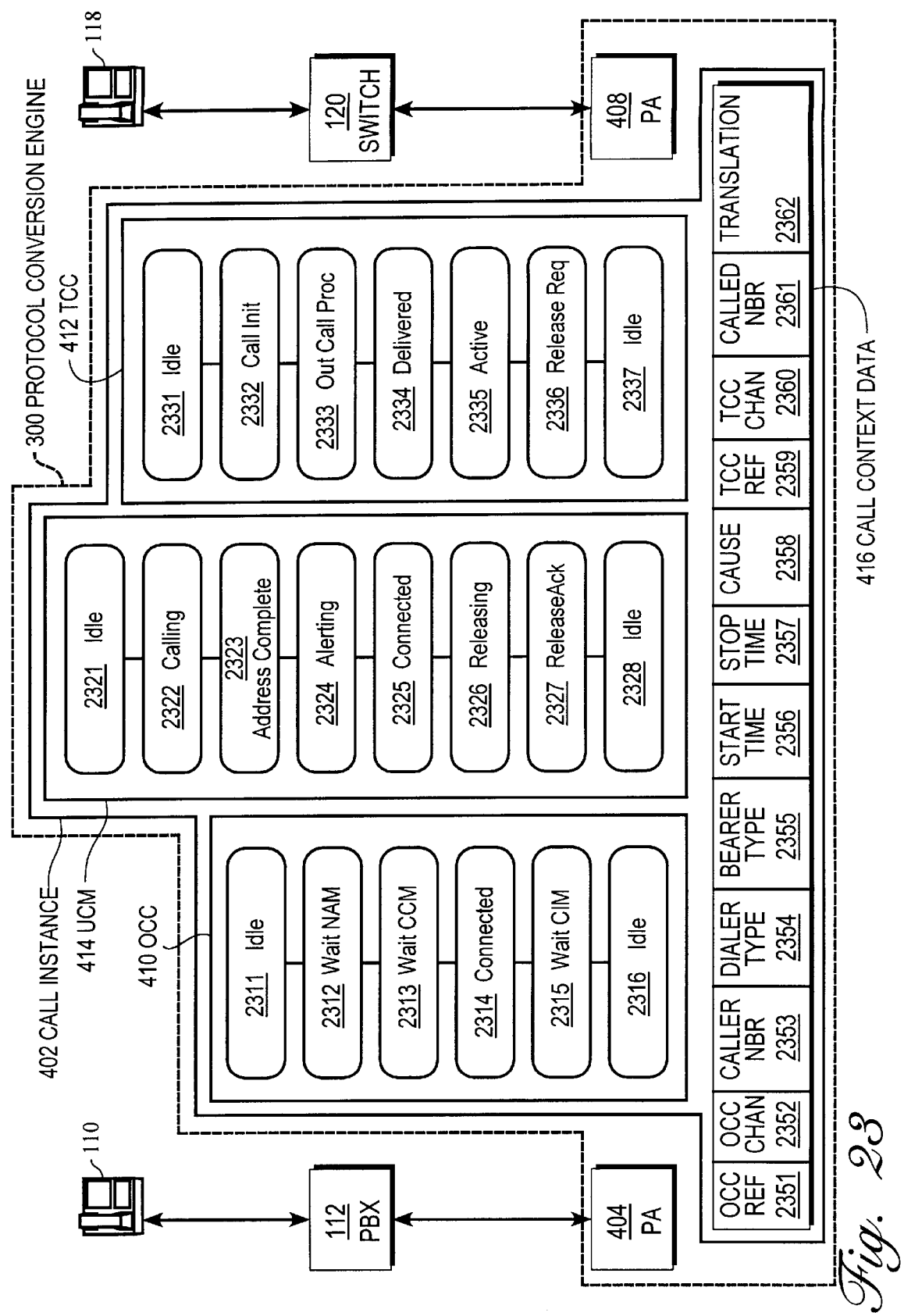
FIG. 23 is an exemplary schematic diagram depicting an illustrative telephone call between subscribers of telephone service supported by network elements using heterogenous protocols as facilitated by the present invention.

With reference now to FIG. 23, the operation of Protocol Conversion Engine 300 can be more easily understood by following the progression of a particular, exemplary standard call, called a Call Instance 402 and graphically denoted, and the changes in the states of OCC 410, UCM 414 and TCC 412. In the context of FIG. 1, a call instance will be made by an originating telephone or calling telephone, denoted User 110, through PBX 112 connected to Universal Protocol Converter 100b and thence through Network 102 to a Network Node or Switch 120 and the terminating telephone or called telephone, denoted User 118. For the purposes of this example, PBX 112 uses a conventional variant of protocol DPNSS and Network Switch uses a conventional variant of protocol ETSI PRI.

OCC 410, UCM 414 and TCC 412 are depicted as having a plurality of states that are entered from the top to the bottom. It is noted that the states depicted for the three state machines are exemplary and those entered depend upon the particular protocol of the machine interfacing with OCC 410 and TCC 412, and depend upon the particular events occurring during the call for UCM 414. OCC 410 is depicted as having transitions between state Idle 2311, state WaitNAM 2312, state WaitCCM 2313, state Connected 2314, state WaitCIM 2315 and state Idle 2316. WaitNAM 2312 is the state indicating that a network node, that has sent address signaling to a terminating network node, is awaiting acknowledgment from the terminating network that complete address signaling has been received. WaitCCM 2313 is the state indicating that a terminating network node is waiting for the subscriber to terminate the call. WaitCIM 2315 is the state in which a network node, that has previously sent a CRM message to a second network node, is awaiting the receipt of a CIM from the second network node. UCM 414 is depicted as having transitions between state Idle 2321, state Calling 2322, state AddressComplete 2323, state Alerting 2324, state Connected 2325, state Releasing 2326, state WaitRlsAck 2327, and state Idle 2328. TCC 412 is depicted as having transitions between state Idle 2331, state CallInit 2332, state OutCallProc 2333, state Delivered 2334, state Active 2335, state ReleaseReq 2336, and state Null 2337. For the particular call instance of the example, Call Context 416 has 12 individually addressable memory cells, a cell 2351 for the OCC Ref, a cell 2352 for the OCC Chan, a cell 2353 for the Caller Number, a cell 2354 for the Dialer Type, a cell 2355 for the Bearer Type, a cell 2356 for the Start Time, a cell 2357 for the Stop Time, a cell 2358 for Cause, a cell 2359 for TCC Ref, a cell 2360 for TCC Chan, a cell 2361 for Called Number, and a cell 2362 for Translated.

In the first step, a PBX 112 subscriber picks up the handset of telephone 110 and dials a number. PBX 112 receives the dialed digits on an available D-channel and sends an ISRM_C message to Protocol Adapter 404 of UPC Protocol Conversion Engine 300 of Universal Protocol Converter 100. An ISRM_C message is the first message that a network node (in this case a switch) received indicating that a new call is being presented. This message contains the following components: Call Reference, Bearer Capability (also known as SIC in the case of DPNSS protocol), Channel Number, Calling Line Type, Originating Line Identity, and Dialed Address. The three state machines 410, 412, and 414 are all set up for the call instantiation in their respective initial Idle states 2311, 2321 and 2331. Protocol Adapter 404 passes the Layer 3 information to OCC 410.

In OCC 410, the logic of the program disassembles the ISRM_C message into its generic components and stores them in the appropriate cells in Call Context 416: Call Reference being stored in cell 2351, Bearer Capability (also being known as Bearer Type) being stored in cell 2355, Channel Number being stored in cell 2352, Calling Line Type being stored in cell 2354, Originating Line Identity (sometimes referred to as the "Caller Number") being stored in cell 2353, and Called Number (sometimes referred to as "Dialed Address") being stored in cell 2361.

OCC 410 sends a signal Call 1130 to the UCM 414 and then moves into state WAITNAM 2312. When signal Call 1130 is received in UCM 414, it is passed on to TCC 412, and UCM 414 moves into state Calling 2322. Signal Call 1110 is received by TCC 412 and the logic of in TCC 412 assembles a Setup message from the information in Call Context 416 which contains the following components: TCC Call Reference, Bearer Capability, TCC Channel ID, Calling Party Number, and Called Party Number. TCC Call Reference is also stored in cell 2359 and TCC Channel is stored in cell 2360. In this example, cell 2362, labeled "Translated" of Call Context 416 contains the same value as cell 2361. The values in cells 2361 and 2362 will normally be the same, unless number translation is enabled. If number translation is enabled, cell 2361 will contain the Called Number and cell 2362 will contain the Translated Called Number.

TCC 412 moves to state CallInitiated 2332 and the Setup message is sent to Protocol Adapter 408. Protocol Adapter 408 adds the Layer 2 information and the entire message is transmitted to Network Switch 120. Network Switch 120 then responds to the Setup message with a CallProceeding message that is passed to TCC 412 through Protocol Adapter 408. TCC 412 receives the CallProceeding message and moves to state OutgoingCallProceeding 2333. TCC 412 then sends a signal AddressAck to UCM 414. When signal AddressAck is received by UCM 414, it moves to state AddressComplete 2323. No message is sent by UCM 414 to OCC 410. Network Switch 120 also sends a Ring signal to Telephone 118 causing it to ring.

Once Telephone 118 is ringing, Network Switch 120 sends signal Alerting to Protocol Adapter 408, which in turn sends it to TCC 412. TCC 412, in turn, sends signal Alerting to UCM 414 and moves to state CallDelivered 2334. UCM 414 passes signal Alerting to OCC 410 and moves to state Alerting 2324. When signal Alerting is received in OCC 410, the logic of the program assembles a NAM message from the information in Call Context 416 and OCC 410 moves to state WaitCCM 2313.

When Telephone 118 is answered, Network Switch a5 sends a signal Connect to Protocol Adapter 408, which passes it to TCC 412. TCC 412 receives signal Connect, and in turn sends a signal Answer to UCM 414 and moves to state Active 2335. When UCM 414 receives signal Answer, the call Start Time is written into cell 2356 of Call Context 416. UCM 414 then sends signal Answer to OCC 410 and moves into state Connected 2325. Signal Answer is received by OCC 410 and the logic of the program assembles a CCM message from the information in Call Context 416. OCC 410 moves to state Connected 2314.

The parties on telephones 110 and 118 then carry out their conversation.

When called Telephone 118 is hung up, network switch 120 sends a Disconnect message to Protocol Adapter 408 which in turn sends it to TCC 412. The logic of the program TCC 412 causes a read of the clearing cause code and saves this as a generic internal clearing cause in cell 2358 of Call Context 416. TCC 412 responds to the Disconnect message by sending a Release message to Protocol Adapter 408. Signal Release is then sent to UCM 414 and TCC 412 moves to state ReleaseRequest 2336. When UCM 414 receives signal Release, it causes the Stop Time to be written into cell 2357 of Call Context 416, and then sends signal Release to OCC 410. UCM 414 then moves into state Releasing 2326.

When signal Release is received in OCC 410, the logic therein assembles a CRM message from the information in Call Context 416, and OCC 410 moves to state WaitCIM 2315. A CRM message is the request by which a network node notifies another network node, with which it has an established bearer connection, that it wishes the connection to be released. OCC 410 then sends message CRM to Protocol Adapter 404, which in turn sends it to PBX 112. PBX 112 responds to message CRM by sending a signal CIM which passes through Protocol Adapter 404 into OCC 410. OCC 410 sends a first signal ReleaseAck to UCM 414, and moves to state Idle 2316. When signal ReleaseAck is received by UCM 414, it moves into state WaitReleaseAck 2327.

When the release is complete, Network Switch 120 sends a message ReleaseComplete through Protocol Adapter 408 to TCC 412. A second signal ReleaseAck is then sent to UCM 414, and TCC 412 moves into state Idle 2337. When the second signal ReleaseAck is received by UCM 414, it moves to state Idle 2328 and the Call Instance is ended. Selected parts and sometimes all of the information in Call Context 416 are saved to hard disk or other non-volatile storage media, that which is saved being determined by the particular management functions desired (e.g. billing information or the frequency that a number is called).

As one skilled in the art will recognize, the elements and processes described are for purposes of the exemplary embodiment, depicted as being hosted within a single computer platform. The operation of the present invention does not require, and is therefore not limited to, the use of a single host for all parts. The existence of conventional data communications and inter-process networking technology permits the distribution of these processes in accordance with the performance requirements of the embodiment of the invention.

We claim:

1. A telecommunications network that comprises:

bearer channels and data channels;

a first telecommunications system having first signals with a first protocol;

a second telecommunications system having second signals with a second protocol;

an input/output means for receiving and transmitting said first and said second signals associated with a call from and to a data channel;

an originating protocol adapter for converting said signals having a first protocol into signals having a base protocol;

an originating call control state machine in communication with said originating protocol adapter;

a universal call model state machine in communication with said originating call control state machine;

a terminating call control state machine in communication with said universal call model state machine; and a terminating protocol adapter for converting said signals having said base protocol into signals having said second protocol.

2. The telecommunications network as claimed in claim 1 and further comprising a call context data in communication with said originating and said terminating call control state machine.

3. A method for converting in real time between two different protocols using a universal protocol converter application implemented on a general purpose digital computer having a processor for executing said application, said method comprising the steps of:

receiving an incoming protocol specific message;

converting said incoming protocol specific message into a first internal non-protocol specific message;

inter-working at least a portion of said first internal non-protocol specific message in accordance with a set of inter-working rules to create a second internal non-protocol specific message, wherein the inter-working rules define, for a plurality of incoming protocols, how to convert the first internal non-protocol specific message into the second internal non-protocol specific message based on characteristics of the incoming protocols; and converting said second non-protocol specific message to an outgoing protocol specific message;

wherein said step of converting said incoming protocol specific method further comprises parsing said incoming protocol specific message into a plurality of protocol data units.

4. A method for converting in real time between two different protocols using a universal protocol converter application implemented on a general purpose digital computer having a processor for executing said application, said method comprising the steps of:

receiving an incoming protocol specific message;

converting said incoming protocol specific message into a first internal non-protocol specific message;

inter-working at least a portion of said first internal non-protocol specific message in accordance with a set of inter-working rules to create a second internal non-protocol specific message; and converting said second non-protocol specific message to an outgoing protocol specific message;

wherein said step of converting said incoming protocol specific method further comprises parsing said incoming protocol specific message into a plurality of protocol data units;

wherein said parsing step further comprises applying channel detail having configuration information about communications facilities connected to said computer, on which said messages travel.

5. A method as claimed in claim 4 wherein said converting said incoming protocol specific message step further comprises creating a set of internal primitives from said plurality of protocol data units to establish said first internal non-protocol specific message.

6. A method as claimed in claim 5 further comprising applying message definitions which are a library of information about said incoming and said outgoing protocols to create said set of internal primitives.

7. A method as claimed in claim 6 further comprising establishing an originating call control state machine and a terminating call control state machine dependent respectively upon said incoming protocol and said outgoing protocol in accordance with a plurality of protocol definitions which are based respectively on said incoming protocol and said outgoing protocol;

formulating information elements within said originating call control state machine from said first internal non-protocol specific messages by applying call context population rules which determine how and where said information elements are stored in a call context; and applying call context extraction rules which control which information elements are extracted from said call context and control manipulating said extracted information elements.

8. A method for converting in real time between two different protocols using a universal protocol converter application implemented on a general purpose digital computer having a processor for executing said application, said method comprising the steps of:

receiving an incoming protocol specific message;

converting said incoming protocol specific message into a first internal non-protocol specific message;

inter-working at least a portion of said first internal non-protocol specific message in accordance with a set of inter-working rules to create a second internal non-protocol specific message; and converting said second non-protocol specific message to an outgoing protocol specific message;

wherein said converting said second non-protocol specific message step further comprises assembling said second non-protocol specific message into a set of internal primitives;

wherein converting said second non-protocol specific message step further comprises creating a second plurality of protocol data units from said second set of internal primitives;

wherein said inter-working step further comprises manipulating said information elements in accordance with said inter-working rules that are dependent on said outgoing protocol specific message, said application of said state machine definitions and said call context definitions wherein both said state machine definitions and said call context definitions are comprised of information about said incoming and said outgoing protocol specific messages.

9. A method for converting in real time between two different protocols using a universal protocol converter application implemented on a general purpose digital computer having a processor for executing said application, said method comprising the steps of:

receiving an incoming protocol specific message;

converting said incoming protocol specific message into a first internal non-protocol specific message;

inter-working at least a portion of said first internal non-protocol specific message in accordance with a set of inter-working rules to create a second internal non-protocol specific message; and converting said second non-protocol specific message to an outgoing protocol specific message;

wherein said inter-working step further comprises applying said inter-working rules that are dependent on said outgoing protocol specific message along with applying state machine definitions and call context definitions wherein both said state machine definitions and said call context definitions are comprised of information about said incoming and said outgoing protocol specific messages.

10. A protocol converter wherein one or more incoming protocol-specific signals are converted in real time into one or more outgoing protocol-specific signals, said protocol converter comprising:

one or more incoming protocol adapters that convert one or more incoming protocol-specific signals into one or more internal non-protocol-specific signals;

one or more outgoing protocol adapters that convert said internal non-protocol-specific signals into one or more outgoing protocol-specific signals; and a call instance for each said internal non-protocol specific signal, said call instance in communication with said incoming and outgoing adapters such that said incoming and outgoing adapters can operate independent of each other;

wherein said call instance further comprises a universal call model state machine to process said non-protocol-specific signals in accordance with one or more inter-working rules, said universal call model state machine established in accordance with a plurality of state machine definitions.

11. The protocol converter as claimed in claim 10, wherein said call instance further comprises an incoming call control state machine that represents the states that the incoming signal is in, said incoming call control state machine established in accordance with a plurality of protocol definitions and state machine definitions based upon the incoming protocol.

12. The protocol converter as claimed in claim 11, wherein said call instance further comprises an outgoing call control state machine that represents the states that the outgoing signal is in, said outgoing call control state machine established in accordance with a plurality of protocol definitions and state machine definitions based upon the outgoing protocol.

13. The protocol converter as claimed in claim 12, wherein said call instance further comprises a call context that stores information elements about said incoming signals, said outgoing signals, and said internal signals, wherein said call context is established in accordance with call context definitions, and wherein said call context is in communication with said originating call control state machine, said terminating call control state machine, and said universal call model control state machine.

14. The protocol converter as claimed in claim 10, wherein said call instance applies protocol definitions to create a set of internal primitives, said protocol definitions containing message definitions, state machine definitions, call context population rules, and call context extraction rules.

15. The protocol converter as claimed in claim 10, wherein said incoming and outgoing protocol adapters convert said incoming and outgoing signals by applying channel detail having configuration information about said incoming and outgoing protocols and incoming and outgoing channels on which said incoming and outgoing signals travel.

16. A computer-readable medium carrying one or more sequences of instructions which, when executed by one or more processors, cause the one or more processors to convert first signals of a first telecommunications system having a first protocol into second signals of a second telecommunications system having a second protocol by performing the steps of:

creating a first set of protocol dependent internal primitives from the first signals;

establishing an originating call control state machine configured to convert said first set of protocol dependent internal primitives into internal non-protocol-specific signals;

establishing a universal call model control state machine configured to process said non-protocol-specific signals in a protocol independent fashion;

establishing a terminating call control state machine configured to convert said non-protocol-specific signals into a second set of protocol dependent internal primitives; and assembling said second set of protocol dependent internal primitives into the second signals.

17. A computer-readable medium carrying one or more sequences of instructions which, when executed by one or more processors, cause the one or more processors to convert in real time between two different protocols using a universal protocol converter application, by carrying out the steps of:

receiving an incoming protocol specific message;

converting said incoming protocol specific message into a first internal non-protocol specific message;

inter-working at least a portion of said first internal non-protocol specific message in accordance with a set of inter-working rules to create a second internal non-protocol specific message; and converting said second non-protocol specific message to an outgoing protocol specific message;

wherein said converting said second non-protocol specific message step further comprises assembling said second non-protocol specific message into a set of internal primitives;

wherein converting said second non-protocol specific message step further comprises creating a second plurality of protocol data units from said second set of internal primitives;

wherein said inter-working step further comprises manipulating said information elements in accordance with said inter-working rules that are dependent on said outgoing protocol specific message, said application of said state machine definitions and said call context definitions wherein both said state machine definitions and said call context definitions are comprised of information about said incoming and said outgoing protocol specific messages.

18. A computer-readable medium carrying one or more sequences of instructions which, when executed by one or more processors, cause the one or more processors to convert in real time between two different protocols using a universal protocol converter application, by carrying out the steps of:

receiving an incoming protocol specific message;

converting said incoming protocol specific message into a first internal non-protocol specific message;

inter-working at least a portion of said first internal non-protocol specific message in accordance with a set of inter-working rules to create a second internal non-protocol specific message; and converting said second non-protocol specific message to an outgoing protocol specific message;

wherein said inter-working step further comprises applying said inter-working rules that are dependent on said outgoing protocol specific message along with applying state machine definitions and call context definitions wherein both said state machine definitions and said call context definitions are comprised of information about said incoming and said outgoing protocol specific messages.

* * * * *